United States Patent [19]

Chung et al.

[11] Patent Number: 4,528,324

[45] Date of Patent: Jul. 9, 1985

[54] PROCESS FOR PRODUCING RTV SILICONE RUBBER COMPOSITIONS USING A DEVOLATILIZING EXTRUDER

[75] Inventors: Rack H. Chung, Clifton Park; Gary M. Lucas, Scotia; August O. Liermann, Schenectady, all of N.Y.

[73] Assignee: General Electric Company, Waterford, N.Y.

[21] Appl. No.: 619,405

[22] Filed: Jun. 12, 1984

Related U.S. Application Data

[63] Continuation of Ser. No. 437,895, Nov. 1, 1982, abandoned.

[51] Int. Cl.³ ............................................. C08L 83/04
[52] U.S. Cl. .................................... 524/863; 264/102; 264/349; 528/15; 528/16; 528/17; 528/12; 528/18; 528/19; 528/21; 528/22; 528/23; 528/33; 528/34; 528/901; 524/860; 524/864
[58] Field of Search ............... 264/102, 349; 528/15, 528/16, 17, 18, 19, 12, 21, 22, 23, 33, 34, 901; 524/863, 864, 860

[56] References Cited

U.S. PATENT DOCUMENTS

| | | | |
|---|---|---|---|
| 2,938,009 | 5/1960 | Lucas | 523/212 |
| 3,243,404 | 3/1966 | Martellock | 524/188 |
| 3,334,067 | 8/1967 | Weyenberg | 528/17 |
| 3,635,743 | 1/1972 | Smith | 106/288 |
| 3,960,802 | 11/1974 | Beers et al. | 524/857 |
| 4,100,129 | 7/1978 | Beers | 528/34 |
| 4,180,642 | 12/1979 | Takago | 528/32 |
| 4,248,993 | 2/1981 | Takago | 528/38 |
| 4,261,758 | 4/1981 | Wright et al. | 428/452 |
| 4,395,526 | 7/1963 | White et al. | 528/21 |

Primary Examiner—Melvyn I. Marquis

[57] ABSTRACT

In accordance with the present invention, there is provided a one-component alkoxy-functional RTV silicone rubber composition in which all the ingredients are continuously mixed in, generally, a devolatilizing extruder. In a more preferred embodiment, the polyalkoxy diorganopolysiloxane polymer is first formed in a static mixer and then this polymer along with the other ingredients are continuously mixed in a devolatilizing extruder to continuously form a preferred alkoxy-functional one component RTV composition of the instant case.

57 Claims, No Drawings

PROCESS FOR PRODUCING RTV SILICONE RUBBER COMPOSITIONS USING A DEVOLATILIZING EXTRUDER

This application is a continuation of application Ser. No. 437,895, filed 11/01/82 now abandoned.

BACKGROUND OF THE INVENTION

The present invention relates to a process for producing a one-component alkoxy functional room temperature vulcanizable (room temperature vulcanizable shall hereinafter be referred to as RTV) silicone rubber composition, and more particularly, the present invention relates to a process for producing a one component alkoxy functional RTV composition utilizing a devolatilizing extruder.

One component alkoxy functional RTV silicone rubber compositions are well known as exemplified by Beers, U.S. Pat. No. 4,100,129. A major innovation in the processing of such composition was a process to anhydrously mix the ingredients prior to packaging in a twin-screw devolatilizing extruder such as disclosed in Beers, et al. U.S. Pat. No. 3,960,802. As pointed out in the foregoing patent, the mixing was carried out much more efficiently in said devolatilizing extruder. In addition, it was found that it was possible to obtain lower viscosities of the mixed composition by the use of a devolatilizing extruder. This was a major innovation in the production of alkoxy functional one component RTV compositions since it permitted the production of such compositions continuously at a somewhat lower cost than was possible with the prior mixing procedures.

Recently, there has been developed a one-component shelf stable alkoxy functional RTV silicone rubber composition such as for instance disclosed in White, et al. U.S. Pat. No. 4,395,526. This patent discloses the initial preparation of a poly-alkoxy terminated diorganopolysiloxane polymer. Once this polymer is prepared, there is added a scavenger to tie-up free alcohol and hydroxy groups in the uncured polymer mixture along with the addition of other ingredients, such as filler, adhesion promoters, condensation catalysts, etc. The innovation in this patent application is the disclosure that to the poly-alkoxy end-capped diorganopolysiloxane polymer there is added a scavenger subsequent to the formation of such a polymer so as to tie-up all hydroxy groups which would degrade it.

The production of such an uncured composition, in which the hydroxyl groups and alcohol in the mixture are tied up, results in a shelf stable composition; that is, even though the compositions of Beers, U.S. Pat. No. 4,100,129 and U.S. Pat. No. 3,960,802 were shelf stable, they still do not have a sufficiently fast cure rate after being stored at periods of time of six months or more. As a matter of fact, as the White et al. case points out, such compositions would suffer a degradation in shelf stability after being stored for periods of time of as little as two weeks.

Accordingly, as pointed out in the White, et al., U.S. Pat. No. 4,395,526 case, the shelf stability of the composition could be prolonged, and the alkoxy functional RTV composition which traditionally has a slow cure rate would have a much faster cure rate if the polyalkoxy terminated diorganopolysiloxane polymer was first formed and there was utilized in the composition a scavenger for hydroxy groups.

There were other developments in this area. For instance, note the patent application of Chung, Ser. No. 338,518, filed on Nov. 11, 1981, now U.S. Pat. No. 4,424,157, in which is disclosed the utilization of certain cyclic amides as scavengers. Further note the disclosure of Beers, Ser. No. 349,537, filed on Feb. 17, 1982, now abandoned which discloses the production of a fast curing shelf stable alkoxy functional composition by the utilization of certain scavengers, and particularly the scavengers of the White, et al. case, U.S. Pat. No. 4,395,526 and in addition, certain other additives which made the composition low modulus. Further, there is a disclosure of Dziark, U.S. Pat. No. 4,417,042, which patent application discloses the utilization of certain silazane scavengers for such compositions. Then, there is the disclosure of Lucas, et al., Ser. No. 349,538, filed on Feb. 17, 1982, now U.S. Pat. No. 4,483,973, which discloses the use of certain adhesion promoters for the alkoxy functional one component RTV systems of White, et al., U.S. Pat. No. 4,395,526 and for the Dziark patent, U.S. Pat. No. 4,417,042 and Beers case, Ser. No. 349,537. There have been further additional developments in the field. For instance, note the disclosure of Chung, et al. entitled, "NOVEL SCAVENGERS FOR ONE COMPONENT RTV COMPOSITIONS", Ser. No. 428,038, filed Sept. 29, 1982, which discloses the use of certain alkoxy functional silazanes as either scavengers or integrated scavengers and cross-linking agents. In addition, there is the disclosure of Chung, entitled, "END-CAPPING CATALYSTS FOR FORMING ALKOXY-FUNCTIONAL ONE COMPONENT RTV COMPOSITIONS", Ser. No. 427,930, filed Sept. 29, 1982, now abandoned, which discloses the utilization of certain acidic catalysts and a combination of acidic and amine catalysts as coupling catalysts for the end-capping of the polyalkoxy terminated diorganopolysiloxane polymer. All these compositions were highly desirable innovations in the production of shelf stable fast curing low modulus one component RTV silicone rubber compositions.

One point should be made clear. Most of the compositions of Beers, U.S. Pat. No. 4,100,129 and Beers, et al., U.S. Pat. No. 3,960,802 would cure after a period of time of a year or even as long as two years. However, the cure rate could be substantially affected and after long periods of storage would be prolonged to an undesirable amount so that the composition was not always simple, efficient, or economical to work with. An improvement of the foregoing White, et al case, U.S. Pat. No. 4,395,526 as well as the other cases, was to produce a shelf stable composition, that is, a composition with a cure rate which did not degrade as much after the composition was stored as did the cure rate of the composition of the foregoing Beers, U.S. Pat. No. 4,100,129, and that of Beers, et al., U.S. Pat. No. 3,960,802. Accordingly, you have a more shelf stable, fast curing composition, with the compositions of the foregoing White, et al., U.S. Pat. No. 4,395,526 and Dziark, et al., U.S. Pat. No. 4,417,042, patents as well as the other cases dealing with the new innovations in the alkoxy functional RTV compositions than you did with the older compositions of the foregoing Beers patents.

It was highly desirable in the method of making such compositions that the silanol end-stopped base polymer be mixed with the cross-linking agent and the end-coupling catalysts without a scavenger in a first mixing step and then in a second mixing step, the condensation catalyst mixture was mixed along with the scavengers.

A much more efficient mixing procedure for such compositions was desirable and particularly a continuous mixing procedure. If a continuous mixing procedure was developed for the mixing of such compositions, then there would be a resultant savings in labor as well as the production of a larger amount of material in a given time.

It is one object of the present invention to provide a continuous mixing procedure for the production of alkoxy functional one component RTV compositions having scavengers in them.

It is another object of the present invention to provide an efficient process for producing a shelf stable, fast curing, alkoxy functional RTV silicone rubber composition in which the mixing is carried out by a devolatilizing extruder.

It is still a further object of the present invention to provide an efficient, continuous mixing process which results in a low viscosity fast curing shelf stable alkoxy functional one component RTV silicone rubber composition, by first mixing and forming the end-capped polyalkoxy diorganopolysiloxane in a static mixer and taking such a polymer and mixing the other ingredients such as filler, in a devolatilizing extruder.

These and other objects of the present invention are accomplished by means of the disclosure set forth herein below.

SUMMARY OF THE INVENTION

In accordance with the above objects, there is provided by the present invention, a continuous process for preparing a stable, substantially anhydrous and substantially acid-free, organopolysiloxane composition stable under ambient conditions in the substantial absence of moisture over an extended period of time and convertible to a tack-free elastomer comprising passing through a static mixer:

(a) an organopolysiloxane wherein the silicon atom at each polymer chain end is silanol terminated;
(b) a polyalkoxy cross-linking agent or an integrated cross-linker scavenger;
(c) an end-capping catalyst which is an acid selected from Lewis acids, Lowry-Brønsted acids, and stearic acid treated calcium carbonate;
(d) a co-catalyst selected from primary, secondary, and tertiary amines and then passing the resulting mixture through a devolatilizing extruder and adding the other ingredients in the devolatilizing extruder to form an RTV composition.

In the above process, the polymer is first end-capped with a polyalkoxy silane or integrated cross-linker in a static mixer. Once such polyalkoxy terminated diorganopolysiloxane polymer is formed, then it is mixed continuously with the other ingredients in the desired steps in the devolatilizing extruder to produce an RTV silicone rubber composition. It has been found that if all the individual ingredients, that is, the ones that form the end-capped polymer, as well as the other ingredients such as filler, adhesion promoters, and condensation catalysts, plasticizers, etc., are added in the extruder, the viscosity of the composition that is produced is very high.

It is hypothesized that the high viscosity is caused by the silanol groups in the filler reacting with the silanol groups in the silanol terminated polymer prior to the alkoxy end-capping reaction tying up such hydroxy groups. As a result, there is substantial cross-linking taking place between the filler and the base polymer resulting in an unduly increased viscosity. The viscosity of the composition does not decrease upon the composition standing. With the instant composition, it is desirable to end-cap the base polymer along with the other ingredients in a devolatilizing extruder. If a low viscosity uncured composition is not desired, then the composition and all the ingredients can be mixed in a devolatilizing extruder.

DESCRIPTION OF THE PREFERRED EMBODIMENT

For the purpose of this application, a scavenger is defined as any compound that will tie up any hydroxy specie in the composition, that is, react with OH-groups to prevent the OH-from further reacting in any polymer degradation reaction in the composition and which is inert to all of the other ingredients in the composition. An integrated cross-linker scavenger is defined as a compound in which part of the compound can perform the same scavenging activity of a scavenging compound and the other portion of the compound can end-cap a silanol endstopped diorganopolysiloxane polymer with one or more alkoxy cross-linking sites, that is, can end-cap a silanol end-stopped diorganopolysiloxane polymer with one or more alkoxy groups.

One point should be made. Although it is desirable that the end-capped diorganopolysiloxane polymer specie have two or more alkoxy groups, so as to form the main constituent of a one component RTV silicone rubber composition, the composition will still perform like a one component RTV composition if some of the polymer species are end-capped with only one alkoxy group on the terminal end of the polymer.

There can be utilized in the instant invention various viscosity depressants and plasticizers to decrease the viscosity of the final composition, such that it has the proper application rate. However, preferably such viscosity depressants are utilized in accordance with the instant invention of preparing the one component RTV silicone rubber composition. Irrespective of whatever viscosity depressants or plasticizers are utilized, these ingredients lower the final viscosity of the RTV silicone rubber composition. It is desirable that a polyalkoxy terminated diorganopolysiloxane polymer be prepared in the static mixer and then this compound along with the other ingredients be mixed in a devolatilizing extruder in a continuous manner. It should be noted that the instant process is essentially completely continuous, that is, the mixing of all the ingredients in the production and packaging of the uncured RTV silicone rubber composition is carried out in a substantially continuous manner.

To produce a low viscosity RTV silicone rubber composition of the instant invention with an application rate greater than about 50 to 100 grams per minute, for a specific gravity of the RTV composition in the range of 1.010 to 1.050, viscosity depressants and plasticizers have to be utilized in the composition such as triorganosiloxy end-stopped diorganopolysiloxane polymers of low viscosities, that is, a viscosity of 10 to 10,000 centipoise at 25° C. and perhaps even low viscosity silanol containing polymers, that is, polymers of viscosity of less than 1,000 centipoise at 25° C. It is believed that the scavengers mentioned previously will absorb the silanol groups in such low viscosity silanol polymers and allow such polymers to perform the viscosity depressant function.

In the broadest conception of the instant invention, all the ingredients may be mixed in the devolatilizing extruder, that is, silanol polymer, filler, plasticizer, a condensation catalyst and an adhesion promoter, etc. In such a process, which is substantially continuous, the devolatilizing extruder is operated at a range of 40° to 100° C., but more preferably in the range of 40° to 60° C. and the extruder is operated at a slight vacuum so as to remove volatiles during the mixing process. However, it has been found that such a mixing procedure in which all the ingredients as described herein, are mixed in the devolatilizing extruder results in RTV products as set forth in the White, et al., case, which tend to have a high viscosity in the uncured state, that is, have an application rate of less than 50 to 100 grams per minute, for a Specific Gravity of the uncured composition which is in the range of 1.010 to 1.050. It should be noted that this application rate range will change for various compositions depending on the desired specific gravity range for a particular RTV composition. The application rate is inversely proportional to the specific gravity.

Accordingly, it is desirable to first produce the polyalkoxy terminated diorganopolysiloxane polymer in the static mixer, in accordance with the preferred embodiment of the instant invention. There is first mixed in the static mixer which is operated at a range of 40° to 100° C. and preferably in the temperature range of 40° to 60° C., the total quantity of silanol end-stopped diorganopolysiloxane polymer with the methyl trimethoxy silane cross-linking agent or broadly polyalkoxy silane cross-linking agent along with the end-capping catalyst or catalysts. This mixing is carried on in a substantially continuous manner to produce a polyalkoxy terminated diorganopolysiloxane polymer. This polymer mixture is continuously fed to the devolatilizing extruder where it is further mixed with other ingredients. The end-capping catalyst that is added along with the polyalkoxy silane cross-linking agent can either be an acid alone or is preferably an acid with an amine co-catalyst as defined in the patent application of Chung, Ser. No. 427,930.

However, for the process to operate continuously, the end-capping catalyst system must consist of the acid catalyst of Chung, Ser. No. 427,930 in combination with a basic amine catalyst as set forth in the same docket. The end-capping will not be accomplished at a sufficient rate if the end-capping is only carried out with an acid or amine catalyst such that it is very difficult to make the process of producing the RTV composition truely continuous.

Further, it should be noted that unless the alkoxy terminated polymer is to be stored prior to mixing the rest of the ingredients in the devolatilizing extruder, it is not desirable to add the scavenger in the static mixer, otherwise the cured silicone elastomer formed from the alkoxy-terminated polymer might tend to be soft. If the alkoxy-terminated polymer is to be stored for up to two years prior to forming an RTV silicone rubber composition from it, then the scavenger compound may be added in the static mixer. The above comments do not apply if an integrated cross-linker scavenger is used since certainly then the cross-linker scavenging compound has to be added in the static mixer unless the silanol polymer is endcapped in the devolatilizing extruder.

Further, it should be noted that a one component RTV composition is not formed from the alkoxy-terminated diorganopolysiloxane end-capped polymer until a tin or other type of condensation catalyst is added to it since the composition will not cure at a sufficient rate or to a sufficient density without a condensation catalyst.

The present process can be applied to produce continuously or semicontinuously or batch any one component RTV composition such as described herein in which there is used a scavenger or integrated cross-linker scavenger. Accordingly, in the static mixer there is formed first a polyalkoxy terminated diorganopolysiloxane polymer by reacting and continuously mixing the silanol end-stopped diorganopolysiloxane base polymer with the polyalkoxy silane cross-linking agent whose formula is given below. The scavenger which may be any scavenger but which is preferably a silazane and more preferably hexylmethyldisilazane can be partially added in the static mixer so as to remove free hydroxyl groups from the polymer mixture, only if the composition is to be stored.

It should be noted that if an integrated cross-linking agent scavenger is utilized in the invention, then the separate addition of scavenger would not have to be carried out in the static mixer. There would just be added in the static mixer, the integrated cross-linker scavenger along with the end-coupling catalyst system and the silanol terminated diorganopolysiloxane polymer.

Proceeding now further to the preferred embodiment of the instant invention, after the silanol end-stopped diorganopolysiloxane polymer has been end-capped with the polyalkoxy silane, continuously in the static mixer, then the polyalkoxy terminated diorganopolysiloxane mixture that is formed is continuously fed to the first stage of the devolatilizing extruder. In the first stage of the devolatilizing extruder, there is fed fumed silica filler and preferably treated fumed silica to the polyalkoxy diorganopolysiloxane formed in the static mixer and the plasticizer blend comprising a mixture of a polyether sag control agent which will be defined below and a trimethylsiloxy end-stopped diorganopolysiloxane polymer and preferably a trimethylsiloxy end-stopped dimethylsiloxane polymer with a viscosity in the range of 10 to 10,000 centipoise at 25° C. Part of the devolatilizing extruder is operated under a slight vacuum that is preferably less than 20 inches of mercury. Preferably the devolatilizing extruder is operated at a temperature in the range of 40° to 100° C. and more preferably, at a range of 40° to 60° C. throughout the devolatilizing extruder and under a vacuum that is less than 20 inches of mercury. Towards the middle stages of the devolatilizing extruder, there is then added to the mixture an amount of scavenger which in the preferred embodiment is a silazane scavenger so as to further tie up hydroxyl groups in the mixture.

The preferred process above and below is described with certain ingredients. However, it should be noted that as far as the instant invention is concerned, these ingredients are exemplary only. Other ingredients may be mixed in a different order than that described below to the alkoxy-terminated diorganopolysiloxane polymer. It is only necessary in the preferred embodiment that the alkoxy-terminated diorganopolysiloxane polymer first be formed in the static mixer and that the other ingredients be mixed in any order desirable in the devolatilizing extruder.

Finally, in the terminal portion of the devolatilizing extruder, there is mixed into the mixture a mixture of a tin condensation catalyst and an adhesion promoter, and excess polyalkoxy silane cross-linking agent. The mixture is then mixed further for a few more stages in the devolatilizing extruder and passed continuously out of the devolatilizing extruder, where it is continually packaged. It should be pointed out that that the adhesion promoter can be any adhesion promoter, but preferably those disclosed in the patent application of Lucas, et al., Ser. No. 349,538, or other types of adhesion promoters. Fumed silica can be utilized at a concentration of 1 to 50 parts by weight per 100 parts of the polyalkoxy terminated diorganopolysiloxane polymer and the triorganosiloxy end-stopped diorganopolysiloxane plasticizer can be utilized in concentrations of 10 to 50 parts by weight and the sag-control agent can be utilized anywhere from 0.1 to 2 parts by weight. These are preferred ranges for the utilization of these agents. Further, the devolatilizing extruder is preferably a twin-screw Werner-Pfleider devolatilizing extruder. Utilizing such a procedure, that is, of a static mixer and devolatilizing extruder and carrying out the mixing as disclosed above, there can be produced an uncured RTV silicone rubber composition having an application rate of greater than 50 grams per minute for a Specific Gravity of composition in the range of 1.030 to 1.050.

Another preferred product that is formed in the devolatilizing extruder is to produce the polyalkoxy terminated diorganopolysiloxane polymer as disclosed above in the static mixer and then to take it and mix it with calcium carbonate and octamethylcyclotetrasiloxane treated fumed silica in the first stages of the devolatilizing extruder. In addition, there is added in the first stages of the devolatilizing extruder, a mixture of a sag-control agent, triorganosiloxy end-stopped diorganopolysiloxane polymer having a viscosity in the range of 10 to 20,000 centipoise at 25° C. and preferably being a trimethylsiloxy end-stopped dimethylpolysiloxane polymer and further a combination plasticizer and/or adhesion promoters comprising an MTD plasticizer having from (i) 15 to 60 mole percent of mono alkyl siloxy units, or a mixture of such units; (ii) from 1 to 6 mole percent of trialkyl siloxy units; and (iii) from 34 to 94 mole percent of dialkyl siloxy units; said plasticizer having from about 0.1 to 2 percent by weight of silicon bonded hydroxy groups. This mixture is then passed into the devolatilizing extruder. Then at about the middle stages of the devolatilizing extruder, there is added an additional amount of a scavenger which in a preferred embodiment of the instant invention is a silazane scavenger. Then, towards the end of the devolatilizing extruder, there is added a condensation catalyst mixture comprising an adhesion promoter, and an excess of polyalkoxy silane cross-linking agent. The mixing is then carried on for a few more stages in the devolatilizing extruder in a continuous manner, whereupon there is emitted from the devolatilizing extruder the RTV mixture which is continuously packaged and stored or shipped as such. By utilizing this method, there can be produced an uncured RTV silicone rubber composition having a high amount of calcium carbonate in it which has an application rate of 50 to 100 grams per minute or more. Again, for this product it is preferred that the temperature of the devolatilizing extruder be maintained in the range of 40° to 100° C. and more preferably, 40° to 60° C. with less than 20 inches of mercury vacuum throughout the extruder. The vacuum is desirable so as to remove volatiles from the mixture as it is being mixed, particularly moisture. Preferably, in addition to the ranges indicated below, there is utilized the second preferred composition for 100 parts of the polyalkoxy terminated diorganopolysiloxane polymer from 50 to 200 parts by weight of the calcium carbonate; from 0.1 to 2.0 parts by weight of the polyether; and from 10 to 50 parts by weight of triorganosiloxy end-stopped diorganopolysiloxane polymer and from to 2 to 20 parts by weight of the MTD plasticizer.

The concentration of ingredients in the catalyst mixture per 100 parts of the polyalkoxy terminated diorganopolysiloxane polymer is preferably parts of excess polyalkoxy silane cross-linking agent. The excess polyalkoxy silane cross-linking agent is utilized in both preferred processes of the instant invention so as to completely terminate the diorganopolysiloxane polymer with alkoxy groups in case some of the alkoxy groups hydrolyzed during the mixing procedure.

It should be noted that even though in the above mixing procedure there were utilized particular types of preferred compositions, that the mixing procedure of the instant case can be utilized to mix any and all of the ingredients disclosed with respect to the above alkoxy functional one component RTV systems of the White et al., U.S. Pat. No. 4,395,526, and related cases.

Further, while the continuous process of the instant case utilizing the static mixer and the devolatilizing extruder has not been tested with all such compositions, it is felt that it should produce all the compositions referred to in the foregoing patent applications disclosed above and below and ingredients disclosed in this patent application. There will be disclosed below the preferred ingredients and alkoxy functional one component RTV compositions which can be utilized and produced in accordance with the instant invention continuously by the use of a devolatilizing extruder with or without a static mixer. It is felt that the instant invention of continuously mixing in a devolatilizing extruder with or without a static mixer should be able to produce the compositions as disclosed in the White et al. case, U.S. Pat. No. 4,395,526, as well as in the other related cases disclosed above. The devolatilizing extruder can be any devolatilizng extruder such as the twin-screw Werner Pfleider devolatilizing extruder or a Buss or P. B. Kokneader devolatilizing extruder.

Now, we will proceed to a more specific description of the various ingredients and compositions that can be used in the instant process although as stated above, all such compositions and ingredients will not be disclosed below but are referred to in the cases set forth in the background of the invention.

As stated above, all kinds of acidic agents may be utilized as end-capping catalysts. By end-capping catalysts, it is meant a catalyst that is utilized in the reaction between the silanol containing organopolysiloxane base polymer and either a polyalkoxy functional silane cross-linking agent or an integrated cross-linking agent, scavenger.

The third type of acidifying agent that has been found to work in the instant invention is stearic acid treated calcium carbonate. Stearic acid treated calcium carbonate has been found to catalyze the end-capping reaction of alkoxy-functional silazane integrated cross-linker, scavenger in accordance with the present invention. It is postulated that this catalysis is due to the presence of the stearic acid in the stearic acid treated calcium carbonate. However, this is a hypothesis only. It is also postulated that such a stearic acid calcium carbonate will also catalyze the end-capping reaction of any other integrated cross-linking agent scavenger compound or even a polyalkoxy functional cross-linking agent such as a methyltrialkoxysilaneand preferably methyltrimethoxysilane. However, again, this is a hypothesis only.

Insofar as the types of acidifying agents that come within the above broad definition in addition to the stearic acid treated calcium carbonate, there are of course the traditional acid anhydrides, the traditional inorganic acids, the traditional silane acidifying agents, and the traditional organic acids. Further, within the broad definition given above, there is also included the traditional acids, classified as Lewis acids such as aluminum chloride, etc. But before going into the definition of such acids, it is necessary to look at a few limitations on the use of such acidifying agents in the end-capping reaction.

First of all, the concentration of the acid that is utilized should be at least an effective amount necessary to promote the end-capping reaction. The concentration of the acidifying agent should not be so high as to cause or catalyze the rupture of any of the siloxane bonds in the silanol-containing organopolysiloxane compounds that is to be end-capped. Another way of saying the same thing, preferably the acid number of the acidifying agent in the reaction medium is such that the acid number as determined by the Silicone Products Division, General Electric Company, Waterford, N.Y., C-204 Test Method should be at least 0.1 and should not exceed 15.

Briefly, the C-204 Test Method consists of taking a 250 ml. flask and adding 100 ml. of isopropanol and 0.25 ml. of the phenolphthalein indicator to the flask. The sample whose acid number is to be determined is then weighed and added to the flask. The resulting solution is then titrated with 0.1N KOH (solution in methanol) to the pink end point. The volume of KOH in methanol used in the titratium is recorded as $V_t$. The total acid number is then calculated from the following formula:

$$\text{Total Acid Number} = \frac{V_t (NKOH) 56.1)}{\text{Sample wt.}}$$

Another way of saying the above is that the total acid number is the number of mg. of KOH to neutralize the free acid in one gram of the sample.

Generally, for most acidifying agents of the type disclosed above, this means that the concentration of the acid of acidifying agent should be within a range of 0.01 to 0.5 parts by weight per 100 parts of the silanol-containing organopolysiloxane. It should be noted that such acidifying agents as disclosed in the instant invention are such in most cases as to yield a rate of the end-capping reaction that is faster than is experienced with the slower basic end-capping catalyst such as the amine catalyst. Nevertheless, in one embodiment of the instant invention, the rate of the acidifying agents when utilized as end-capping catalysts can be increased further by combining the acidifying agents with the traditional basic amine catalyst such as that disclosed in the White et al. patent.

All amines can be used as co-catalysts within the scope of the instant invention including primary, secondary and tertiary amines whether silated or completed in one fashion or another. The more basic the amine, the more effective it is as a catalyst. Examples of preferred amines that can be used within the scope of the instant invention are for instance:

$(Me_2N)2—C≡NC_3H_7Si(OCH_3)_3$
$(Me_2N)_2—C≡NC_4H_9$
$H2NC_3H_7Si(OEC)_3$
$H2NC_3H_7Si(OCH_3)_3$
$H2NC_3H_7NC_3H_7Si(OCH_3)_3$
Jeffamine T-403
Tetramethylpiperidine
Piperidine
1,4-Diazabicyclo [2.2.2] octane
N-Methylmorpholine
N,N-Dimethylethylenediamine
N-Methylpiperidine
N-hexylamine
Tributylamine
Dibutylamine
Cyclohexylamine
Di-N-hexylamine
Triethylamine
Benzylamine
Dipropylamine
N-ethylphenylamine Thus, primary, secondary, and silated secondary amine silanes can be utilized in combination with the acidifying agents of the present invention to further increase the rate of the end-capping over that which is accomplished by the acidifying end-capping catalysts by themselves. It should be noted that the foregoing primary, secondary and tertiary amines and the silated amines disclosed above are exemplary only and any type of such amines may be utilized in combination with the acidifying agent of the present invention as end-capping co-catalyst. Generally, such amines when they are utilized as end-capping catalyst, are used in a concentration of anywhere from 0.1 to 1.0 parts by weight per 100 parts by weight of the silanol end-stop diorganopolysiloxane polymer that is to be end-capped. However, such use of a basic co-catalyst in combination with the acidifying catalyst of the instant case is optional. However, such a basic catalyst is necessary if the process is to be continuous. In other cases, such basic amine co-catalyst are not necessary. Thus, in many cases, the acidifying agents of the present invention will react and catalyze the end-capping reaction that is desired with sufficient efficiency. It should be noted with the foregoing alkoxy functional silazane integrated cross-linkers, scavengers of Chung, et al., Ser. No. 425,038 that these acidifying agents will promote end-capping reaction with sufficient rapidity as compared to the amine catalysts that were utilized by themselves in the past.

Preferably, such acidifying agents are used as end-capping catalysts in the present invention in the concentrations indicated previously. Preferably, and this is especially true with the inorganic acids, the acidifying agent must have the foregoing acid numbers in the reaction medium. This is especially true in connection with the maximum acid number. If the acid number is above the maximum limit indicated previously, then the acidifying agent may tend to catalyze the rupture of the siloxane bond either within the immediate reaction period or at subsequent times when the composition is formed and stored prior to being utilized; or, even in fact, when in some cases the siloxane elastomer is formed.

Accordingly, it is highly desirable that the maximum acid number indicated previously is not exceeded and generally should not exceed 15, and preferably, not exceed 5 as determined by the C-204 method.

Any of the acidifying co-catalysts can be utilized as stated previously alone or in combination with one of the amine co-catalysts defined previously which are the amine end-capping catalysts of the prior art within the concentrations given previously and for the reasons given previously. However, as pointed out, in most cases this should not be necessary. Further, as pointed out, for most end-capping reactions, the present acid/amine end-capping catalysts are considerably more efficient than is the case with the prior art basic amine catalysts. Now, proceeding to the reaction in which such acidifying catalysts are utilized, such acidifying catalysts are utilized in any of the compositions and reactions discussed in the background of the invention with respect to alkoxy functional one-component RTV compositions in which the object is to end-cap a silanol-containing organopolysiloxane polymer and more preferably a silanol terminated polymer with either a polyalkoxy functional silane or one of the alkoxy containing integrated cross-linkers, scavengers of the foregoing patent applications, and particularly those disclosed in the patent of White, et al. and in the patent of Dziark, and the patent application of Chung et al., filed on the same date as the present case.

It must be pointed out that the end capping reaction is the one in which the polyalkoxy terminated diorganopolysiloxane polymer is first formed in accordance with the disclosure of the White et al patent to which at that time or subsequent to that time, is added a scavenger which will act to tie up all hydroxy groups in the RTV polymer composition so as to preserve the shelf stability of the composition. In a most preferable form, the present end-capping catalyst is utilized in the reaction of a polyalkoxy functional silane of Formula (4) below which is the formula of a cross-linking agent that is more preferably utilized to produce the end-capped polymer, which is reacted with the base silanol containing diorganopolysiloxane polymer, to form a polyalkoxy terminated diorganopolysiloxane base polymer to which is added a scavenger in accordance with the White, et al. patent. It is desirable to first form a polyalkoxy terminated diorganopolysiloxane polymer, with the use of a polyalkoxy functional silane of Formula (4) below or by the use of integrated cross-linker scavenger. This is the most preferable route in forming the RTV polymer compositions of the instant case. To facilitate and increase the efficiency of the end-capping reaction, it is desirable to utilize one of the end-capping acid/amine catalysts of the instant case. Without such end-capping catalysts, either a basic catalyst or an acid catalyst, the polyalkoxy functional silane of Formula (4) below will react with a silanol containing organopolysiloxane only slowly if at all. Accordingly, in order to commercialize this reaction and to speed up the manufacturing process, and in the interests of economy, it is highly desirable to use an end-capping catalyst composed of an acidifying agent and a basic amine.

Such is especially desirable in the case when the end capped polymer is formed before the scavenger is added to the RTV system such as disclosed in the patent of Dziark, and the patent application of Chung, et al., filed on the same date as the present case.

Further, as stated where the silanol terminated diorganopolysiloxane polymer of Formula (1) is end-capped with a combination of an integrated cross-linker scavenger such as disclosed in the foregoing patent application of Chung, et al., it is necessary again to utilize one of the acidifying end-capping catalysts of the instant case to promote the end-capping catalysts of the instant case to promote the end-capping of the silanol terminated diorganopolysiloxane polymer of Formula (1) in an as efficient manner as possible.

Accordingly, we will now proceed to a description of the preferred RTV systems in which the acidifying catalysts of the instant case may be used to form an end-capped polymer. It should be understood that these catalysts generally may be used in any end-capping reaction between an alkoxy functional silane and a silanol-containing organopolysiloxane polymer.

The silanol-terminated polydiorganosiloxane has the formula,

(1)

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, which a cross-linking silane having hydrolyzable radicals attached to silicon.

As utilized hereinafter, the term "stable" as applied to the one package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Stable, substantially acid-free, one package, moisture curable polyalkoxy-terminated organopolysiloxane RTV compositions can be made by using a silanol terminated polydiorganosiloxane consisting essentially of chemically combined diorganosiloxy units of the formula

(2)

such as a silanol-terminated polydiorganosiloxane of formula (1), where R is as previously defined, with an effective amount of certain silane scavengers for chemically combined hydroxy radicals. In the silanol-terminated polydiorganosiloxane consisting essentially of chemically combined Formula (2) units, the presence of silicon bonded $C_{(1-8)}$ alkoxy radicals, such as methoxy radicals is not precluded. The hydroxy radicals which can be removed by the silane scavenger can be found in materials normally present in the RTV composition of the present invention, for example, trace amounts of water, methanol, silanol radicals on the silica filler (if used), the silanol polymer of Formula (1), or a silanol-terminated polymer having Formula (2) units. The silane scavenger useful for eliminating chemically combined hydroxy radicals in accordance with the practice of the invention preferably has the formula

where $R^1$ is a $C_{(1-8)}$ aliphatic organic radical selected from alkyl radicals, alkylether radicals, alkylester radicals, aklylketone radicals and alkylcyano or a $C_{(7-13)}$ aralkyl radical, $R^2$ is a $C_{(1-13)}$ monovalent organic radical selected from R radicals as previously defined, and defined more particularly below, X is a hydrolyzable leaving group selected from amido, amino, carbamato, enoxy, imidato, isocyanato, oximato, thioisocyanato, and ureido and other radicals. The preferred members are amino, amido, enoxy, and the more preferred is amido, for example, N-$C_{(1-8)}$ alkyl $C_{(1-8)}$ acylamido, a is an integer equal to 1 or 2 and preferably 1, b is a whole number equal to 0 or 1 and the sum of a+b is equal to 1 or 2. In Formula (3), where a is 2, X can be the same or different. The leaving group X reacts preferentially before $-OR^1$ with available $-OH$ in the RTV composition and provides an RTV composition substantially free of halogen acid, or carboxylic acid. The silane scavenger of Formula (3) is both the silane scavenger for hydroxy functional groups and a poly-alkoxysilane cross-linking agent for terminating the silicon atom at each organopolysiloxane chain-end with at least two alkoxy radicals.

Among the ingredients of the RTV compositions which are formed as a result of the use of the hydroxy scavenger of Formula (6), is silanol-free polydiorganosiloxane, chain-terminated with two or three $-OR^1$ radicals. The silanol-free polydiorganosiloxane optionally can be combined with an effective amount of a cross-linking silane, as defined hereinafter, under substantially anhydrous conditions. The cross-linking polyalkoxysilane which can be utilized in combination with the scavenging silane of Formula (3) has the formula

where $R^1$, $R^2$ and b are as previously defined. The preferred condensation catalysts which can be used in the practice of the invention include metal compounds selected from tin compounds, zirconium compounds, and titanium compounds or mixtures thereof.

It is not completely understood why the polyalkoxy-terminated organopolysiloxane compositions of the present invention are stable in the presence of certain condensation catalysts over an extended period of time in the substantial absence of moisture.

A mechanistic study of the RTV of the present invention supports the theory that the use of scavenging silane of Formula (3) or (5) below in combinations thereof with crosslinking silane of Formula (4), in accordance with the practice of the invention, minimize the likelihood that detrimental amounts of $R^1OH$ will be generated during the shelf period. $R^1OH$ generation is to be avoided because $R^1OH$ endstops the silanol polymer of Formula (1) or polymer with Formula (2) units to produce polymers having terminal

units. These polymers, wherein the silicone atom at each polymer chain end is terminated with only one alkoxy radical, may have slow cure times. In addition, $R^1OH$ can breakdown the organopolysiloxane polymer in the presence of the condensation catalyst.

The use of the silane scavenger for hydroxy of Formula (3) and (5), in which the leaving group X is not a halogen radical, substantially eliminates undesirable water in the filler and silicone polymer, as well as residual moisture in the RTV composition during the shelf period. In determining what level of silane scavenger of Formula (3) or (5) to use in the practice of the invention, the total hydroxy functionality of the RTV composition can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3% by weight, based on the weight of the polymer. The aforementioned 3% of scavenger by weight exceeds that amount required to substantially eliminate available hydroxy functionality in the polymer as a result of reaction between OH functionality and X radicals. In compositions which also contain filler and other additives, the additional amount of scavenger of Formula (5) and (6) which is required is estimated by running a 48 hour stability check at 100° C. to determine whether the tack-free time remains substantially unchanged as compared to the tack-free time of the composition before aging measured under substantially the same conditions.

In Formulas (1-5), R is preferably selected from $C_{(1-13)}$ monovalent hydrocarbon radicals, halogenated hydrocarbon radicals and cyano alkyl radicals, $R^1$ is preferably a $C_{(1-8)}$ alkyl radical or a $C_{(7-13)}$ aralkyl radical, $R^2$ is preferably methyl, phenyl, or vinyl.

The expression "substantially acid-free" with respect to defining the elastomer made from the RTV composition of the present invention upon exposure to atmospheric moisture means yielding by-products having a pKa of 5.5 or greater with 6 or greater preferred and 10 greater being particularly preferred.

It has been further found that improved cure rates can be achieved if minor amounts of amines, substituted guanidines, or mixtures thereof, are utilized as curing accelerators in the polyalkoxy compositions of the present invention. There can be used from 0.1 to 5 parts, and preferably from about 0.3 to 1 part of curing accelerator, per 100 parts of the silanol-terminated polymer of Formula (1), or which consists of chemically combined units of Formula (2), or 100 parts of the polyalkoxy-terminated polymer to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

It appears that the curing accelerators described herein, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, i.e., less than about 30 minutes which remains substantially unchanged after accelerated aging.

Also included within the present invention is a method of making a room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises adding to the silanol-terminated organopolysiloxane in a static mixer, a stabilizing amount of a polyalkoxy-silane which is both a scavenger for hydroxy functional groups and a cross-linking agent of the formula

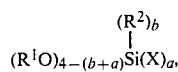

where $R^1$, $R^2$, X, a and b are as previously defined, in the presence of end-capping catalysts of the present case, and thereafter adding an effective amount of a condensation catalyst, whereby improved stability is achieved in the resulting room temperature vulcanizable organopolysiloxane composition.

In an additional aspect, there is provided a method of making a stable, one-package room temperature vulcanizable polyalkoxy-terminated organopolysiloxane composition which comprises agitating, in a devolatilizing extruder, under substantially anhydrous conditions, a room temperature vulcanizable material selected from
(i) a mixture comprising on a weight basis
 (a) 100 parts of a silanol-terminated poly-diorganopolysiloxane consisting essentially of chemically combined units of Formula (2).
 (b) an amount of silane of Formula (3) sufficient to scavenge available —OH in the RTV composition and provide up to 3% by weight excess based on the weight of polydiorganosiloxane composition;
 (c) 0 to 10 parts of a cross-linking silane of Formula (4)
and mixing with the resulting mixture in a devolatilizing extruder; and
(ii) a mixture comprising:
 (a) 100 parts of a polyalkoxy-terminated organopolysiloxane;
 (b) 0 to 10 parts of a cross-linking silane of Formula (4);
 (c) an effective amount of a condensation catalyst;
 (d) a stabilizing amount of silane scavenger and optionally
 (e) 0 to 5 parts of a curing accelerator Radicals included within R of Formula (1) and (2) are, for example, aryl radicals and halogenated aryl radicals, such as phenyl, tolyl, chlorophenyl, napthyl, aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxy-ethyl; alkylester radicals, for example, 2-acetoxy-ethyl; alkylketone radicals, for example 1-butan-3-onyl; alkylcyano radicals, for example, 2-cyanoethyl. Radicals included within $R^2$ are the same or different radicals included within R radicals.

Some of the cross-linking polyalkoxysilanes included within Formula (4) are, for example, methyltrimethoxysilane; methyltriethoxysilane; ethyltrimethoxysilane; tetraethoxysilane; vinyltrimethoxysilane; etc.

Among the curing accelerators which can be used in the practice of the invention are silyl substituted guanidines having the formula, $$(Z)_g Si(OR^1)_{4-g}, \qquad (6)$$

where $R^1$ is as previously defined, Z is a guanidine radical of the formula,

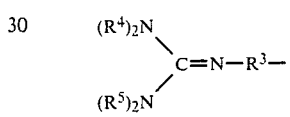

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula,

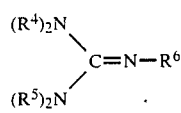

where $R^4$ and $R^5$ are as previously defined and $R^6$ is a $C_{(1-8)}$ alkyl radical, also can be employed. Some of the silyl substituted guandines included within Formula (6) are shown by Takago, U.S. Pat. Nos. 4,180,642 and 4,248,993.

In addition to the above substituted guanidines, there can be used various examples, for example, di-n-hexylamine, dicyclohexylamine, di-n-octylamine, di-n-butylamine hexamethoxymethylmelamine, and silylated amines for example, y-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure acclerators herein also act as scavengers and, in certain instances, as stabilizers in the compositions of this invention.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1-3-propanedioxytitanium bis(acetylacetonate); diisopropoxytitanium bis(acetylacetonate); titanium naphthenate; tetrabutyltitanate; tetra-2-ethylhexyl-titanate; tetraphenyltitanate; tetraoctadecyltitanate; ethyltriethanolaminetitanate. In addition, beta-dicarbonyltitanium compounds as shown by Weyenberg, U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of major amount of extending materials, such as ground quartz, polyvinylchloride, or mixtures thereof, preferably having an average particle size in the range of from about 1 to 10 microns.

As used hereinafter, the expressions "moisture free conditions" and "substantially anhydrous conditions", with references to the present invention, mean mixing in a dry box, or in a closed container which has been subjected to vacuum to remove air, which thereafter is replaced with a dry inert gas, such as nitrogen. Experience has shown that sufficient scavenging silane of Formula (3) should be utilized as previously defined. Temperature can vary from about 0° C. to 180° C. depending upon the degree of blending, the type and amount of filler.

In conforming with Dziark, U.S. Pat. No. 4,417,042, the scavenger may be a silazane. A room temperature vulcanizable organopolysiloxane composition is produced by preparing in a static mixer, an organopolysiloxane wherein the silicon atom at each polymer chain end is terminated with at least 2 alkoxy radicals and mixing the end-capped polymer in a devolatilizing extruder with an effective amount of a condensation catalyst, and a stabilizing amount of a silane scavenger for hydroxy functional groups which is selected from a silicon-nitrogen compound selected from the class consisting of:

(a) a silicon-nitrogen compound having the formula

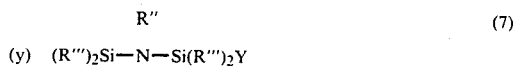

where Y is selected from R''' and R''$_2$N— and, (b) a silicon-nitrogen polymer comprising (1) from 3 to 100 mole percent chemically combined units selected from the class consisting of units having

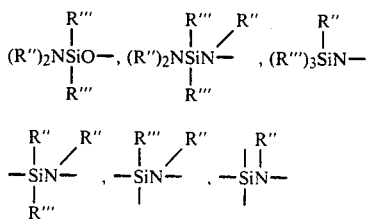

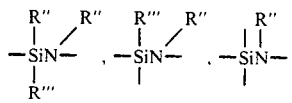

and (2) from 0 to 97 mole percent chemically combined structural units represented by the formula

and mixtures thereof where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R'' radical and (R'')$_2$N radical, and where the ratio of the sum of said R''' radicals and said (R'')$_2$N radicals to the silicon atoms of said silicon-nitrogen polymer has a value of 1.5 to 3, inclusive, R'' is a member selected from the class consisting of hydrogen and C$_{(1-12)}$ monovalent hydrocarbon radicals, and fluoroalkyl radicals, R''' is a member selected from hydrogen, monovalent hydrocarbon radicals and fluoroalkyl radicals, and c is a whole number equal to 0 to 3 inclusive, and optionally, (3) an effective amount of a curing accelerator selected from the group consisting of substituted guanidines, amines and mixtures thereof.

The most preferred compound within the scope of the formula of the silicon-nitrogen compound is a silazane and more particularly hexamethyldisilizane. Other compounds within the scope of the formula may be utilized as scavengers in the instant case such as hydrogen-containing amines, as will be explained below.

There is envisioned within the present invention that such scavengers are not mixed cross-linking agent scavenger compounds, but rather there is utilized a separate cross-linker and the silyl-nitrogen material is a separate compound which is added to that composition.

Thus, in the preferred embodiment of the instant case, there is first added the cross-linking agent to the silanol-terminated diorganopolysiloxane polymer in the presence of an end-capping catalyst. The preferred end-capping catalyst for this purpose is one of the acidifying and basic amine catalysts of the present case.

Once the polyalkoxy-terminated polymer is formed, then the scavenger is added in the devolatilizing extruder, that is, one of the silicon-nitrogen compounds disclosed above to absorb all hydroxyl groups. Then all the other ingredients may be added into the composition whereupon the scavenger will absorb the additional hydroxy groups from such materials also. As a result of the preparation of the composition in this manner, there will be prepared a composition which is substantially free of hydroxy groups and as a result is shelf-stable and fast-curing; by shelf-stable, it is meant that it will have a rate and degree of cure which is substantially the same six months or one year after manufacture as it was immediately after its manufacture.

In the above formulas of the silicon-nitrogen compound and silicon-nitrogen polymer, the R″ and R‴ radicals may be selected from hydrogen and any monovalent hydrocarbon radicals including fluoroalkyl radicals. Examples of the radicals from which the R″ and R‴ can be selected are, for instance, alkyl radicals such as methyl, ethyl, propyl, etc.; cycloalkyl radicals such as cyclohexyl, cyclohepthyl, etc.; mononuclear aryl radicals such as phenyl, methylphenyl, ethylphenyl, etc.; alkenyl radicals such as vinyl, allyl, etc.; fluoroalkyl radicals such as 3,3,3 tri-fluoropropyl. Generally, the R″ and R‴ radicals may have from 1 to 12 carbon atoms and more preferably the radicals may have from 1 to 8 carbon atoms.

In addition to the above described silicon-nitrogen materials, there are also included in the present invention, silicon-nitrogen materials having divalent hydrocarbon radicals attached to the silicon atoms through silicon-carbon linkages. For example, also included among the silicon-nitrogen materials that can be employed in the practice of the invention are arylenesilazanes, such as phenylene silazanes, and alkylenesilazanes such as methylenesilazanes. In addition, various other silicon-nitrogen materials containing divalent hydrocarbon radicals are also contemplated including copolymers and terpolymers such as silicon-nitrogen materials containing intercondensed siloxane units and silarylenesilazane units, intercondensed silazane units, silarylenesiloxane units, and siloxane units, etc. The silicon-nitrogen polymers in the form of silazane/siloxane copolymers having at least 3 mole percent of chemically combined siloxy units and up to 97 mole percent of combined siloxy units.

Accordingly, the silazane polymers can include cyclics consisting of chemically-combined

units where R″ and R‴ are as previously defined to provide for a ratio of 1.5 to 3.0 of the sum of the R‴ and R″₂N radicals for silicon atoms in the silazane polymer.

The definition of a silazane polymer includes linear polymers having at least one unit of the class consisting of

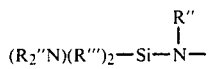

units and

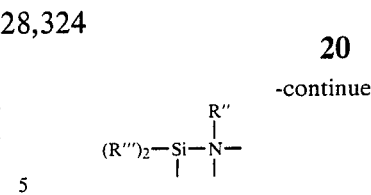

or R″ and R‴ are as previously defined to provide for a ratio of 1.5 to 3 of the sum of the R‴ and R″₂N radicals per silicon atoms in the silazane polymer.

Further silazane polymers which are included within the definition of the above polymers comprise linear polymers consisting essentially of

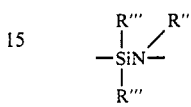

units where R″ and R‴ are defined to provide for a ratio of 1.5 to 3.0 of the sum of the R‴ and R″N₂N radicals per silicon atom in the silazane polymer.

In addition, the silazane polymers include polymers having at least one unit selected from the class consisting of

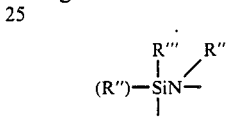

units and

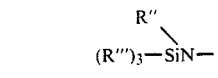

where R″ and R‴ are as previously defined to provide a ratio of 1.5 to 3 of the sum of the R‴ and R″₂N radicals per silicon atom in the silazane polymer.

In addition, the silazane polymers can comprise also polymers having a sufficient amount of units selected from

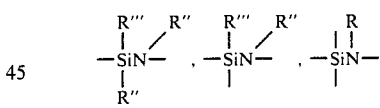

where R″ and R‴ are as previously defined to provide for a ratio of 1.5 to 3 of the sum of the R‴ and R″₂N radicals per silicon atom in the silazane polymer.

The silazane/siloxane copolymers can also be in the form of cyclics and consist of chemically combined R″₂′SiO units and

units where R″ and R‴ are as previously defined.

Linear silazane/siloxane copolymers are also included where the mole percent of

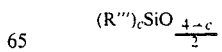

units can be as high as 97 mole percent with the balance of the units being selected from

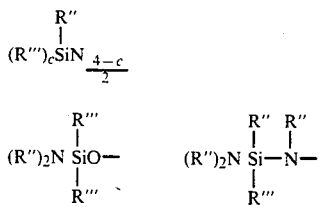

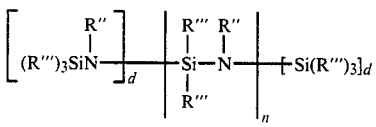

where R" and R'" are as previously defined to provide for a ratio of the sum of R'"+R"$_2$N radicals per silicon of the silazane/siloxane copolymer from 1.5 to 3.

Other linear silazanes that are included within the scope of the formula above are ones having the formula $$\left[(R''')_3SiN\overset{R''}{\underset{}{|}}\right]_d\left[\overset{R'''}{\underset{R'''}{|}}Si-\overset{R''}{\underset{}{|}}N\right]_n[Si(R''')_3]_d$$

where R" and R'" are as previously defined, n is a positive whole number and is preferably from 0 to 20 inclusive, and d is a whole number equal to 0 to 1 inclusive and when d is equal to 0, n is preferably equal to 3 to 7, inclusive.

Illustrating the silazanes that can be employed in the practice of the present invention within the scope of the above formulas are hexamethylcyclotrisilazanes, octamethylcyclotetrasilazane, trimethyl-triphenylcyclotrisilazanes, trivinyltrimethylcyclotrisilazane, etc.

In addition to the silazanes of the above formulas, there is also included polysiloxanes having terminal silylamine units or silazane units as shown by the formula

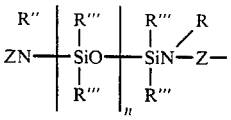

where R" and R'" are as defined previously, Z is a member selected from R" and SiR"'$_3$, where R" and R'" and n are as defined previously. The polysiloxane compounds of the above formula may be prepared by taking ammonia or an amine and reacting it at a temperature within the range of between about 0° to 60° C. with a halogenated polysiloxane having the formula

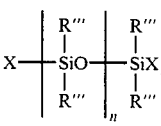

where R'" and n are as defined above and X is a halogen radical such as chloro or bromo. If a terminal silazane radical is desired, for example, a molar amount of (R")$_3$Si X can be reacted along with the halogenated polysiloxane, at least equivalent to the moles of halogen radicals contained therein. It will, of course, be appreciated that amines of the formula

H$_2$NR"

are utilized for forming the silazy chain-stopped polysiloxanes of the invention where R" is as defined above, while in the case when materials are desired having terminal silyl amine radicals, amines, includes amines of the above formula can be employed having at least one hydrogen available for reaction to produce the desired polysiloxane.

Accordingly, the process for producing such polymers and compounds is well known.

Fluoroalkyl-substituted silazane compounds can also be prepared by a method as disclosed in the patent application of Matsomoto, Ser. No. 195,579, filed on Oct. 8, 1980, now abandoned.

The existence of such silyl-nitrogen compounds and silyl-nitrogen polymers as well as their methods of preparation is disclosed in U.S. Pat. No. 3,243,404 to which a worker skilled in the art can refer to for more information.

In addition to the foregoing silyl-nitrogen compounds and silyl-nitrogen polymers disclosed above, there can also be utilized in the instant invention scavengers which are silyl amines of the formula

 (9)

where R$^{20}$ is a radical selected from the class consisting of C$_{(1-8)}$ monovalent hydrocarbon radicals and C$_{(1-8)}$ alkoxy radicals and fluoroalkyl radicals, and R" is selected from hydrogen and a C$_{(1-8)}$ monovalent hydrocarbon radical, and g is a whole number that varies from 1 to 3, h is a whole number that varies from 0 to 2 and the sum of h+g does not exceed 3. Compounds coming within the scope of the above formula are, for instance, methyl, di(methylamino) silane, tris (methylamino)silane, methyl bis (diethylamino) silane as well as the following:
tris(diethylamino)silane
methylbis(dimethylamino)silane
tri(ethylamino)silane
ethyl di (methylamino)silane
ethyl di (ethylamino)silane
ethyl bis (dimethylamino)silane Such amines are disclosed in U.S. Pat. No. 3,243,404 and can be produced by the methods disclosed in that patent. The silyl-nitrogen compounds and polymers are the most preferred in the instant compositions as scavengers. The above amines can also be utilized as scavengers in the RTV composition of the instant case. The only difficulty with the hydride amines is that they do tend to liberate hydrogen upon standing and also they tend to impart the undesirable odor of amines to the RTV composition. However, if this is not a problem, then they can be tolerated in the instant composition. Preferably, the silyl-nitrogen compounds such as hexamethyldisilizane and the rest, are utilized in a concentration of 0.5 to 10 parts by weight per 100 parts of the base organopolysiloxane polymer.

Accordingly, the preferred silyl-nitrogen compounds and polymers within the scope of the above formulas may be utilized in the instant invention. As stated previously, generally, preferably from 0.5 to 10 parts of the scavenger is used per 100 parts by weight of either the silanol base polymer or the polyalkoxy base polymer. Whether the base polymer is silanol-stopped or polyalkoxy-stopped as will be explained below, makes little difference in the concentration of the scavenger since the molecular weight of both compounds is approximately the same. More generally, the scavenger may be utilized in a concentration of 1 part to any concentration that is desired. It is not desirable to add too much of the scavenger since about 10 parts may detract from the cured physical properties of the composition. It is generally desired to have at least 3% of the scavenger in the composition, that is, 3% over the amount necessary to absorb or end-cap all the free hydroxy groups in the composition.

Further, in accordance with Chung, et al., Ser. No. 428,038, there is also provided by the present invention, a continuous process for forming a stable, one-package, substantially anhydrous and substantially acid-free, room temperature, vulcanizable, organopolysiloxane composition, stable under ambient conditions, in the substantial absence of moisture over an extended period of time, and convertible to a tack-free elastomer comprising mixing in a static mixer:

(A) an organopolysiloxane wherein the silicon atom at each polymer chain end is terminated with at least 1 hydroxy radical;

(B) a stabilizing amount of scavenger for hydroxy functional groups selected from the class consisting of non-cyclic silyl nitrogen scavenger of the formula

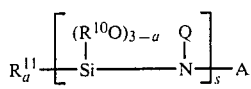 (10)

and cyclic silyl nitrogen scavengers having at least one or all of the units of the formula

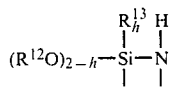 (11)

and the rest of the units, if any, having the formula

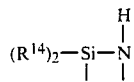 (12)

where $R^{10}$ is a $C_{1-8}$ aliphatic organic radical selected from the group consisting of alkyl, alkylether, alkylester, alkylketone, alkylcyano, and aryl, $R^{11}$ is a $C_{1-8}$ monovalent substituted or unsubstituted hydrocarbon radical, Q is selected from hydrogen, $C_{1-8}$ monovalent substituted or unsubstituted hydrocarbon radicals and radicals of the formula

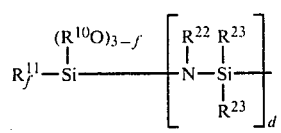 (13)

where $R^{10}$, $R^{11}$ are as previously defined, where a varies from 0 to 2 where f varies from 0 to 3, h is 0 or 1, where s is a whole number that varies from 1 to 25, d is a whole number that varies from 1 to 25, $R^{22}$ is selected from hydrogen and $C_{1-8}$ monovalent hydrocarbon radicals and $R^{23}$ is selected from monovalent hydrocarbon and hydrocarbonoxy radicals. A is selected from the class consisting of hydrogen and $C_{1-8}$ monovalent substituted or unsubstituted hydrocarbon radicals and a radical of the formula

 (14)

where $R^{10}$, $R^{11}$ are as previously defined, g varies from 0 to 3 and in the above scavengers, there is at least one hydrocarbonoxy group in the molecule, $R^{12}$ as defined the same as $R^{10}$ and $R^{13}$ is defined the same as $R^{11}$, and $R^{14}$ is defined the same as $R^{11}$, and mixing the polymer formed in a devolatilizing extruder with the condensation catalyst and other ingredients.

In the case when it is desired to have an integrated cross-linker scavenger compound in the RTV system, and s=1 and d=1, the same compounds as disclosed above may be utilized except in such compounds there are at least three and preferably four alkoxy groups or hydrocarbonoxy groups in the linear, or cyclic silazane compound or one alkoxy group on each silicon atom for a cyclic compound. In the case s and d are greater than one, then preferably there are at least two hydrocarbonoxy groups on the terminal silicon atoms and one hydrocarbonoxy group on each internal silicon atom; although generally some components or polymer species can still function as integrated cross-linkers having some silicon atoms with no hydrocarbonoxy groups.

Two or one alkoxy groups in the compound result in it acting effectively as a scavenger, but unfortunately, it does not have sufficient alkoxy functionality for it to impart to the composition necessary cross-linking capabilities. Further, these alkoxy compounds can all be made by the traditional processes as disclosed in Dziark, referred to previously.

In the formulas of the linear or branch-chained, non-cyclic silyl nitrogen scavenger, the radical $R^{10}$ can be selected from radicals such as alkyl radicals such as methyl, ethyl, propyl, etc.; alkylether radicals such as methyl methyl ether, methyl ethyl ether, methyl propylether, ethylethylether, ethyl propylether, 2-methoxyethyl, 2-ethoxyethyl, 2-propoxymethyl, etc.; alkylester radicals such as methyl ester, ethyl ester, propyl ester, butyl ester, 2-acetoxyethyl, 2-acetoxypropyl, etc.; alkylketone radicals such as 1-butan-3-onyl, methyl methyl ketone, methyl ethyl ketone, ethyl methyl ketone, ethyl ethylketone, etc.,; and alkylcyano radicals such as methyl nitrile; and aryl radicals such as phenyl, methylphenyl, etc. Basically, the $R^{10}$ radical can be any alkyl and phenyl radical of 1-8 carbon atoms, and more preferably one of the radicals disclosed above. Most preferably, $R^{10}$ is selected from methyl. In the compound of Formula (13), $R^{11}$ is generally from a $C_{1-8}$ monovalent substituted or unsubstituted hydrocarbon radical such as alkyl radicals such as methyl, ethyl, propyl, etc.; a cycloalkyl radical such as cyclohexyl, cycloheptyl, etc.; an olefinic radical such as vinyl, allyl, etc.; a mononuclear aryl radical such as phenyl, methylphenyl, ethylphenyl, etc.; or a substituted hydrocarbon radical such as a fluoroalkyl radical, such as 3,3,3-trifluoropropyl. The radicals $R^{23}$ are independently selected from the same radical as $R^{11}$ and further $C_{1-8}$ hydrocarbonoxy radicals. Further $R^{22}$ is selected from hydrogen and the same radicals as $R^{11}$.

Accordingly, preferably $R^{11}$ is selected from an alkyl radical of 1–8 carbon atoms and is most preferably selected from hydrogen. Alternatively, the radical Q can be selected from any $C_{1-8}$ monovalent substituted or unsubstituted hydrocarbon radicals which can be any of the radicals defined for $R^{11}$ with the caveat that desirably, there are no more than eight carbon atoms in the radical.

The other part of the definition of the compound of Formula (10) is that a varies from 0 to 2 and f varies from 0 to 3, where Q is selected from hydrogen and $C_{1-8}$ monovalent hydrocarbon radicals, and where the sum of a+f does not exceed 5, and there is at least one alkoxy radical in the compound of Formula (10). The reason for the restrictions on a and f is so that they will be in accordance with the description of the silazane compounds of the instant invention, and that there will be at least one alkoxy group in the molecule. It should be noted that the manner in which the compounds of the present invention distinguish over the compounds of that of Dziark, is that the compounds of the instant invention have hydrocarbonoxy groups in them. The compounds of the Dziark patent do not have hydrocarbonoxy groups in them. The advantages of the hydrocarbonoxy groups of the instant case have been set forth previously.

Further, in the definition of the compound of Formula (10) is that preferably s is a whole number that varies from 1–25 and is most preferably 1, and d is preferably a whole number that varies from 1–25, and is most preferably 1–10. It should be noted that the simpler alkoxy silazane compounds are the desirable ones since they are the easiest to obtain and are the ones that are obtained in maximum yield. However, the higher molecular weight hydrocarbonoxy silazane compounds can also be utilized in the instant invention within the scope of the above formulas.

Further, in the foregoing Formula (10), A is preferably selected from the class consisting of hydrogen and the same $C_{1-8}$ monovalent substituted or unsubstituted hydrocarbon radicals as were defined previously for $R^{11}$. Most preferably, A can be selected from hydrogen, methyl or ethyl radicals.

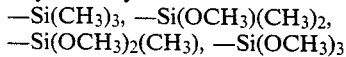

In the compounds of the foregoing Formulas (13) to (14), it is preferred that in one embodiment when the silazane compound is a scavenger, that $R^{10}$ and $R^{11}$ be methyl, and the Q radical be hydrogen.

In addition to the above, linear and branch-chained, non-cyclic silazane compounds, there can be utilized alkoxy-functional cyclic silazane compounds in the instant invention. Accordingly, there can be a cyclic silyl nitrogen scavenger having at least one or all of its units, units of Formula (14) and the rest of the units, if any, having Formula (15). Preferably, the compound is made up of units of Formula (14); however, the cyclic compound may have units of Formula (14) interspersed with Formula (15). However, the caveat holds that the cyclic compound must have at least one hydrocarbonoxy or alkoxy group in the compound as well as be a cyclic silazane compound to be utilized in the instant invention.

It should be noted that in the instant application, there is a distinction between hydrocarbonoxy silazane compounds, whether linear or cyclic which have at least one hydrocarbonoxy group in them and those that have at least three or four hydrocarbonoxy groups in them when s=1 and d=1. The ones that have at least one—but less than three alkoxy groups—can be utilized as scavengers only in the instant invention. These hydrocarbonoxy silazane compounds of the instant case, which is at least three or four hydrocarbonoxy groups when s=1, d=1 or which have more hydrocarbonoxy groups in accordance with the disclosure above when s and d are greater than one, can be utilized both as scavengers and integrated cross-linkers, i.e., the compound, if utilized in the proper quantities, will tie up unbonded hydroxy groups in the polymer mixture as well as act as a cross-linking agent to cross-link the base silanol material so as to form an alkoxy end-capped diorganopolysiloxane polymer, which, upon exposure to atmospheric moisture, will hydrolyze to form a silicone elastomer.

It should be noted further that the compound having at least three hydrocarbonoxy groups or more in it can also be utilized as a scavenger only irrespective of whether it can function as an integrated cross-linker. In any case, when there is utilized a cross-linker, and the silazane compound has at least three hydrocarbonoxy groups in it, some of the hydrocarbonoxy silazane compound will function as a cross-linking agent as well as a scavenger due to the statistical reactivity results of the composition.

In this respect, it should be noted that the hydrocarbonoxy silazane compound which has less than three hydrocarbonoxy groups in it can only function as a scavenger with the possible exception of the case where s=1, Q=H in accordance with Chung, Ser. No. 428,038 and, accordingly, must be utilized with this concept in mind. With respect to quantities of the compound to be utilized, this is discussed elsewhere in the case, but as a guide, there may be utilized per 100 parts by weight of the silanol polymer, 1 to 12 and more preferably from 3 to 7 parts of a hydrocarbonoxy silazane compound. In the case where the hydrocarbonoxy silazane compound functions both as a cross-linking agent and as a scavenger, then per 100 parts by weight of the base silanol polymer, there is generally utilized 2.0 to 12 parts of the hydrocarbonoxy silazane compound, and preferably 3 to 8 parts of such compounds per 100 parts of the base silanol polymer. These concentration ranges are general, especially in the second case because how much of the hydrocarbonoxy compound that is used as both a cross-linking agent and a scavenger will depend on the amount of hydrocarbonoxy groups in the molecules of such hydrocarbonoxy silazane compound. Further, though the cyclic silazane compound can be any cyclic silazane, most preferably it is a trisilazane or tetrasilazane since these are the most readily available cyclic silazanes. However, it can also be a pentasilazane or higher cyclosilazane. It must be appreciated, in the normal course of producing such cyclic silazanes, that most of the compounds that are produced are cyclic tetrasilazanes and cyclictrisilazanes. However, some higher cyclic silazanes are also produced and these higher cyclic silazanes in the mixture along with the cyclic trisilazanes and cyclotetrasilazanes can be used as scavengers or as both scavengers and cross-linking agents in the instant invention, depending on their hydrocarbonoxy functionality as is described below.

The reason for the fact that there must be at least three hydrocarbonoxy groups in the silazane molecules in order for the silazanes to function as a cross-linking agent as well as a scavenger, is that it is desirable that when the endcapping group ties up the silanol group at the terminal end of the polymer, that there is appended to the silyl group at least two alkoxy groups. If this is the case, that is, most of the polymer is terminated by at least two hydrocarbonoxy or alkoxy groups, then such terminated base polymer will be shelf-stable and effectively cross-link to produce a shelf-stable composition. The rest of the hydrocarbonoxy silazane can simply function to tie up other unbonded hydroxy groups in the polymer mixture that are present other than the hydroxy groups at the terminal end of the silanol-terminated diorganopolysiloxane base polymer. Further, as stated previously, while the above concentration ranges have been given for the silazane compounds, both in the case when they are utilized as scavengers only or when they are utilized as scavengers and cross-linking agents, these concentrations are just general guides and are not critical. What is important is that there be a minimum amount of silazane compound irrespective of whether it is to function as a scavenger only or both as a scavenger and an integrated cross-linker. Accordingly, this minimum amount of silazane compound is at least 3% excess over the stoichiometric amount needed to react with all the excess water and all the excess unbonded hydroxy groups in the polymer mixture, and generally, in most compositions, can be set at the level of at least one part by weight of scavenging silazane compound per 100 parts of the base silanol end-stopped diorganopolysiloxane polymer.

When the integrated cross-linker scavenger compound is used, it is preferred that the endcapping reaction be catalyzed with the catalysts of this case and the scavenger added in the static mixer. For more information as to these alkoxyfunctional silazanes as integrated cross-linker scavengers one is referred to Chung, et al., Ser. No. 428,038.

Before proceeding to the Examples, it is necessary to make certain points about the invention. First of all, with regard to silanol end-stopped organopolysiloxane polymer of Formula (1), it is preferred that the silanol groups be on the terminal silicon atom. In such polymers, that is the polymers of Formula (1), some silanol groups can be tolerated in the polymer chain. Such silanol groups in the polymer chain will allow slightly more cross-linking to take place in the cure of the polymer. If there are too many silanol groups in the polymer chain, it may be difficult to completely cure the polymer. Preferably, however, most of the silanol groups are present on the terminal silicon atoms in the polymer chain of the polymer of Formula (1).

The second point that is to be made is that in the formation of the end-capped polymer produced by the reaction of either the polyalkoxy functional silane cross-linking agent or the integrated cross-linking agent, scavenger which reacted with the silanol end-stopped diorganopolysiloxane polymer, that is after such an end-capped polymer is formed, there may be present some polymer species having only monomethoxy groups on one or both ends of the polymer chain. All of the polymer species should not be of this particular type of specie since then considerable difficulty may be encountered in the cure of the composition. Thus, it is desirable in order to have a proper rate of cure or to have a fast curing RTV composition, that there be polyalkoxy groups on the terminal silicon atoms of most of the polymer species in the RTV composition.

Finally, as stated previously, the former basic amine end-capping catalyst work very ineffectively or not at all, as end-capping catalysts for some integrated cross-linking agents, scavengers which are used to end-cap a silanol end-stopped diorganopolysiloxane polymer such as that of Formula (1). In the case of the alkoxy functional silazane integrated cross-linking agent scavengers of Chung, et al., Ser. No. 428,038, the traditional basic amine end-capping catalyst operate very poorly as end-capping catalyst. The present end-capping acidifying agents of the present case are much superior as end-capping catalysts for such materials and for a continuous process, must be used in combination with the amines.

The preferred method of making the RTV compositions of the present case, that is a low modulus non-corrosive, fast-curing composition that is shelf-stable, is to utilize a polyalkoxy-terminated diorganopolysiloxane polymer, that is to form the polyalkoxydiorganopolysiloxane first, remove or scavenge the hydroxy groups in the composition, and then add the other ingredients as desired. This may be done by adding the silanol polymer of Formula (1) to the cross-linking agent of Formula (4), that is prereacting the silanol polymer with a cross-linking agent, and in the presence preferably of a catalyst and preferably an end-capping catalyst to produce the desired dialkoxy end-capped polymer and then taking this di- or tri-alkoxy end-capped polymer and adding a scavenger to it so as to absorb the silanol groups. Then the other ingredients can be added to the composition under substantially anhydrous conditions to prepare a one-component RTV package, which will be shelf stable and will cure at a sufficiently fast rate, that is be fast-curing even with tin soap catalyst in the composition. The first basic ingredient in accordance with the instant invention, which may be added to the above RTV system after it has been prepared, in accordance with the above process, that is the polyalkoxy material is from 2 to 20 parts by weight per 100 parts by weight of diorganopolypolysiloxane base polymer, (that is either in terms of 100 parts by weight of the silanol polymer of Formula (1) or in terms of 100 parts by weight of the polyalkoxy-terminated organopolysiloxane polymer) is first a plasticizer fluid polysiloxane containing a high degree of trifunctionality or a mixture of tri-and tetrafunctionality and comprising:
(i) from 5 to 60 mole percent of monoalkylsiloxy, siloxy units or a mixture of such units;
(ii) from 1 to 6 mole percent of trialkoxysiloxy units and
(iii) from 34 to 94 mole percent of dialkyl siloxy units, said first plasticizer polysiloxane containing from 0.1 to about 2% by weight of silicon-bonded hydroxyl groups.

It should be pointed out that this polysiloxane first plasticizer polysiloxane fluid may be added generally at a concentration of 2 to 20 parts by weight of the base polymer generally, or more preferably, a concentration of 5 to 15 parts by weight per 100 parts by weight of a base polymer. Such a polysiloxane functions in the instant composition as a plasticizer and adhesion promoter and more particularly, a plasticizer. Above 20 parts by weight per 100 parts of the base polymer is undesirable. Accordingly, generally it should not be used above 20 parts by weight and below 2 parts by weight it does not have much of an effect. Preferably, the fluid will have a viscosity in the range of 15 to 300 cps at 25° C. Preferably, also, in the fluid polysiloxane plasticizer at least 50% of the alkyl substitutents are methyl and the fluid comprises from 0.2 to 0.6 percent by weight of silanol. Especially, preferably the monoalkylsiloxy units, siloxy units or mixed such units comprise about 10 to 30 mole percent, the trialkylsiloxy units comprise from 3 to 5 mole percent, the dialkylsiloxy units comprise from 65 to 87 mole percent and the silanol content is about 0.2 to 0.6 percent by weight.

Accordingly, while such trifunctional fluid will plasticize the base composition so as to make it low modulus, it will not in all cases make it sufficiently low modulus and sufficiently low in viscosity by itself. Accordingly, it is highly desirable that there be 100 parts of the base polymer utilized in addition to the trifunctional fluid, from 10 to 50 parts by weight of a second plasticizer per 100 parts of said base organopolysiloxane polymer.

As stated previously, by base organopolysiloxane polymer, it is meant either the silanol terminated diorganopolysiloxane polymer of Formula (1) or the polyalkoxy-terminated diorganopolysiloxane polymer or various mixtures of both. Since the alkoxy groups add very little to the molecular weight of the polymer, the concentration of the various additives in addition to the trifunctional fluid that will be discussed below will be substantially the same as expressed in terms of either polymer system.

Accordingly, per 100 parts by weight of the base organopolysiloxane polymer, there may be utilized from 5 to 60 parts by weight of a second plasticizer which is a linear triorganosiloxy end-stopped diorganopolysiloxane polymer of a viscosity varying from 10 to 20,000 centipoise at 25° C. and in which the organo groups are selected from $C_{(1-8)}$ monovalent hydrocarbon radicals. More preferably, these monovalent hydrocarbon radicals are alkyl radicals of 1 to 8 carbon atoms. Thus, preferably, the second plasticizer has the formula

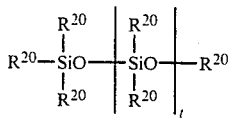 (15)

where $R^{20}$ is a monovalent hydrocarbon radical, preferably, an alkyl or phenyl radical of $C_{(1-8)}$ carbon atoms or generally $C_{(1-8)}$ alkyl or aryl radical and t varies such that the viscosity of the polymer varies from 10 to 20,000 centipoise at 25° C. Most preferably, the $R^{20}$ group is methyl and the polymer has a viscosity varying from 10 to 10,000 centipoise at 20° C. more preferably having a viscosity varying from 10 to 1000 centipoise at 25° C. Generally, such polymers by the way they are made have from 500 to 1500 parts per million of silanol as OH. The general process for producing such plasticizer of Formula (15) above is to hydrolyze the appropriate chlorosilanes. Thus, triorganochlorosilane is hydrolyzed with diorganodichlorosilane in water, then the hydrolyzate is removed and purified by decantation and other procedures used to result in the desired linear diorganopolysiloxane polymer of Formula (15). Such a polymer just by this natural hydrolysis method has usually 500 to 1500 parts per million of silanol as OH, and may be further purified by other procedures. However, this is not normally done because of the expense. Further, such silanol groups or hydroxy groups will not cause difficulty in the present situation if there is a scavenger that absorbs substantially all such hydroxy groups that are present in such a polymer. As noted previously, there has to be utilized a scavenger in the instant system that absorbs all the free hydroxy groups in such a plasticizer.

As noted previously, in order to get the Modulus of the composition to a desirably low level, there has to be utilized two plasticizers since the trifunctional fluid alone will not result in both the maximum decrease in viscosity and modulus. Thus, if it is desired to obtain the lowest modulus, maximum adhesion and minimum viscosity to increase the ease of application of the sealant, it is necessary to use both plasticizers. Accordingly, the most preferred low modulus, one-component RTV systems of the present case are produced by utilizing the two plasticizers of the present invention in the foregoing proportions shown above. It should be noted that within the above broad range of the second plasticizer of from 5 to 60 parts, there may preferably be utilized a concentration of 20 to 45 parts by weight.

Another aspect is making the composition low cost. The composition may be made low cost by incorporating in it anywhere from 50 to 300 parts or more by weight per 100 parts of the base organopolysiloxane of an extending filler as noted above. An extending filler is desirable in the composition, and adds to the strength of the composition without detracting from its low modulus properties. Most preferably, the filler is calcium carbonate. The most desirable calcium carbonate is the one that is treated with stearic acid. This gives the best flow properties to the uncured composition of the present case and the best low modulus properties specified previously. Other extending fillers may be incorporated into the present composition in the foregoing concentrations of calcium carbonate that have been disclosed above.

Thus, other extending fillers and reinforcing fillers that may be utilized in various concentrations, are for example, titanium dioxide, zirconium silicate, silica aerogel, iron oxide, diatomaceous earth, fumed silica, carbon black, precipated silica, glass fibers, polyvinyl chloride, ground quartz, etc. The amounts of filler used can obviously be varied within wide limits in accordance with the intended use. For example, in some sealant applications, the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

However, the fillers utilized at a concentration of 50 to 300 parts by weight should be an extending filler such as calcium carbonate for the low modulus compositions of the present case. In addition to the extending filler, there is utilized from 1 to 50 parts and preferably, from 1 to 10 parts, by weight per 100 parts of the base organopolysiloxane polymer of a reinforcing filler. The reinforcing filler may be selected from precipitated silica, and fumed silica, and is most preferably fumed silica. More preferably, there is utilized a fumed silica that is treated either with cyclopolysiloxanes as disclosed in Lucas, U.S. Pat. No. 2,938,009 or with silazanes as disclosed in Smith, U.S. Pat. No. 3,635,743. More preferably, there is utilized from 1 to 10 parts be weight of said treated fumed silica treated with cyclopolysiloxanes. Such fumed silica acts as a sag control agent to make the composition thixotropic. Thixotropic means that the composition when put on a vertical plane will not flow in the uncured state, or will have only minimal flow. Another way of making the composition thixotropic is as disclosed in Lampe, et al., U.S. Pat. No. 4,261,758 which is hereby incorporated by reference.

Thus, per 100 parts of the base organopolysiloxane polymer with the reinforcing fumed silica, and in addition to the extending filler, there may be incorporated in the RTV composition from 0.1 to 2.0 parts by weight per 100 parts by weight of the organopolysiloxane of a second sag control agent which is a polyether selected from the formulas consisting of $$A-O-(C_xH_{2x}O)_a-B$$

and $$A-O-(C_xH_{2x}O)_n\overline{\uparrow_y}O_z$$

where A and B represent radicals selected from the class consisting of hydrogen, alkyl radicals containing from 1 to 12 carbon atoms, cyclo alkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

$$\begin{matrix} & O \\ & \| \\ R- & C-O- \end{matrix}$$

where R is alkyl containing from 1 to 11 carbon atoms; Q is a residue of a polyhydric initiater radical containing at least two hydroxyl radicals selected from the class consisting of ethylene glycol, glycerol, trimethylolpropane, and other polyhydric alcohols having from 2 to 6 hydroxyl groups; n is a number having a value of 2 to 4; y has a value of from 2 to 10; and Z has a value of from 1 to 5; the polyether having a molecular weight of from about 300 to about 200,000.

The polyether which is a sag control agent may be utilized in addition to the fumed silica or in place of it to impart thixotropic properties to the uncured RTV composition which is desired in a sealant. It must be noted that the preferred RTV composition of the present case, that is, non-corrosive, low modulus, fast-curing, shelf-stable low modulus is very desirable as a sealant in constructing buildings, in glazing applications and in other manufacturing sealant applications. Accordingly, it is highly desirable that such sealant be thixotropic, that is when it is inserted in the uncured state in a crevice, it will not flow. Such thixotropy may be incorporated in the present composition by the utilization of fumed silica in small quantities in combination with the above polyethers. Further, the polyethers are present at preferably from 0.1 to 1.0 parts by weight, in combination with the fumed silica. Although the fumed silica will provide sag control properties to the composition, these properties are considerably enhanced with the incorporation of the polyether. For more information as to the use of the polyethers as a sag control agent, one is referred to the disclosure of Lampe et al., U.S. Pat. No. 4,261,758 which is hereby incorporated by reference.

Examples of commercially available polyethers which may be utilized in the present invention are such polyethers as Pluracol V-7 sold by the Wyandotte Chemicals Corporation, and UCON LB-1145 sold by the Union Carbide Corporation of Connecticut.

In place of both of these sag control agents or in addition to them, there may be utilized per 100 parts by weight of the base organopolysiloxane of from 0.2 to 2.0 parts and more preferably from 0.2 to 1.5 parts by weight of a hydrogenated castor oil.

An example of hydrogenated castor oil that may be utilized as a sag control agent is one known as Thixcin (tradename of NL Chemicals, Heightstown, N.J.)

Accordingly, when a hydrogenated castor oil is utilized as a sag control agent, neither the fumed silica or the polyether has to be utilized. However, when the hydrogenated castor oil is not utilized as a sag control agent, then there should be utilized the fumed silica with the polyether. As an alternative, the fumed silica or polyether may be used alone. Please note that it must be emphasized that a reinforcing filler is not necessary in the present composition since it is desired to make the composition low modulus. A reinforcing filler in large quantities will undesirably increase the modulus of the present composition. Most preferably, the fumed silica if used is used in addition to the extending filler such as calcium carbonate and specifically stearic acid treated calcium carbonate which reduces the cost of the composition, keeps the viscosity of the uncured composition and the modulus of the uncured composition at a low level. There may be added various other types of additives to the composition as they become available or as they are invented.

Thus, they may be incorporated into the present composition per 100 parts of the organopolysiloxane of 0.1 to 10 parts by weight of an adhesion promoter. The present compositions, that is, the composition of the White et al. case, do not bond very well to substrates. Accordingly, it is desirable to utilize a primer with such compositions or an adhesion promoter. The primers are undesirable in that they add additional labor costs to the application of the sealant. Accordingly, it is highly desirable that there be utilized or incorporated into the composition a self-bonding additive. For instance, note the recitation of self-bonding additives as disclosed in Lucas et al., Ser. No. 349,538, filed on Feb. 17, 1982, which is incorporated by reference.

An adhesion promoter that may be utilized in the instant invention, one is referred to Mitchell, Ser. No. 349,600, now U.S. Pat. No. 4,472,590, which is incorporated by reference.

Other adhesion promoters as they are developed may be able to be utilized in this composition in addition to the ones disclosed in the prior case of Lucas et al., Ser. No. 349,538. It should be noted that the instant composition is low modulus, fast curing and shelf stable in addition to its other properties and that this low modulus property of the composition is imparted to it by the plasticizers. It is also thixotropic in accordance with the addition of a thixotropic agent disclosed previously and is low cost if the preferred extending filler of the present case is utilized.

Any of the other adhesion promoters that were disclosed in Lucas et al., case, Ser. No. 349,538, or in the present case, may be utilized. In addition, other additives as they are developed may be utilized in the compositions of the present invention.

It must be appreciated that the MTD oil and the triorganosiloxy end-stopped diorganopolysiloxane plasticizers are necessary ingredients in the instant compositions if the uncured silicone composition is to have an application rate within the preferred ranges indicated above. An RTV silicone rubber composition prepared with a static mixer and a devolatilizing extruder in accordance with the instant invention still does not have an application rate of about 50 to 150 grams per minute or greater for specific gravity of uncured compositions in the range of 1.010 to 1.050 without plasticizers. To obtain an uncured RTV silicone rubber composition continuously, that in the uncured state has the foregoing application rate, it is not only necessary that it be produced by a combination of a static mixer and a devolatilizing extruder as outlined above, but further, it is necessary that there be used one or more plasticizers in the fabrication of the composition. Thus, to obtain the preferred application rate, it is desirable that there be used in the fabrication of the composition at least the foregoing MTD oil defined above. In the most preferred embodiment, it is preferred that there be utilized both the MTD oil defined above and the triorganosiloxy end-stopped diorganopolysiloxane polymer also defined above in the foregoing quantities so as to obtain an uncured RTV silicone rubber composition having an application rate within the preferred ranges indicated above.

The disclosures of White et al., U.S. Pat. No. 4,395,526, Dziark, U.S. Pat. No. 4,417,042 and Chung, et al. Ser. No. 428,038, as well as all the other patents and patent applications referred to in this case are specifically incorporated in the present application by reference.

Further, it should be noted that the present continuous process can be used to produce any one component alkoxy functional RTV composition such as for instance disclosed in Beers U.S. Pat. No. 4,100,129.

In addition, the instant process can be used with any scavenger or integrated cross-linker scavenger keeping in mind that the polymer is end-capped first in the static mixer and then the end-capped polymer is mixed with the other ingredients in the devolatilizing extruder. The other ingredients can be any ingredients normally associated with one-component RTV compositions. Again, all the ingredients can be mixed in the devolatilizing extruder if the increased viscosity is not a factor. With respect to the application rate, it must be borne in mind whether referring to the Specification or Claims that the application rate values given herein is for a composition having a Specific Gravity in the range of 1.030 to 1.050.

Further, the process can be made semi-continuous or batch by first mixing in the static mixer and then after a time in the extruder, but this is not generally desirable.

The examples below are given for the purpose of illustrating the present invention. They are not given for any purpose of setting limits and boundaries to the instant invention. All parts in the examples are by weight.

EXAMPLE 1

Examples 1–5 were carried out in a devolatilizing extruder only. This example, as well as Examples 2–5, illustrates preparing the composition continuously in a devolatilizing extruder only. The devolatilizing extruder that was utilized was a Werner-Pfleider twin-screw devolatilizing extruder. In the hopper of the extruder, there was continuously added therein 17 parts of octamethyltetrasiloxane treated fumed silica. In the first barrel of the extruder, there was added 100 parts by weight of a silanol end-stopped dimethylpolysiloxane, having a viscosity in the range of 100,000 to 200,000 cps. at 25° C., 10 parts by weight of a plasticizer fluid, having 3 mole percent of trimethylsiloxy monofunctional units, 20 mole percent of methylsiloxy trifunctional units, and 77 mole percent of dimethylsiloxy difunctional units, having a viscosity of 50 cps at 25° C. and 0.5% weight silanol.

This fluid shall hereinafter in the Examples be referred to as the "MTD" fluid. To these three ingredients, then there was further added in the first barrel of the extruder 40 parts by weight of trimethylsiloxy end-stopped dimethyl polysiloxane of 100 cps viscosity at 25° C. with about 500 parts per million of silanol and 0.2 parts by weight of a polyether sag control agent sold under the name of Pluracol V-7.

In the second barrel of the devolatilizing extruder, there was continuously added 5 parts by weight of methyl trimethoxy silane, 0.33 parts by weight of acetic acid and 0.67 parts by weight of n-dihexylamine. In barrel eleven or towards the end of the devolatilizing extruder, there was added 5 parts by weight of hexamethyldisilizane, 1.7 parts by weight of 3-(2-aminoethylamino)-propyl-trimethoxysilane as an adhesion promoter, and 0.33 parts of dibutyltindiacetate. The devolatilizing extruder was maintained at a temperature of about 50°±5° C. and the production rate of RTV uncured silicone rubber composition was about 151 pounds per hour. This composition had an application rate of 38 grams per minute. The devolatilizing extruder has thirteen separate mixing stages, that is, compartments in which mixing is carried out and in which ingredients could be added if desired.

EXAMPLE 2

The extruder of Example 1 was operated in the same manner and the same ingredients were added in barrel one or stage one and barrel eleven or stage eleven. However, in barrel two or stage two, instead of the catalyst mixture of Example 1 there was added in this example 6.25 parts by weight of methyltrimethoxy silane, 0.41 parts by weight of acetic acid, and 0.84 parts of n-dihexylamine. The processing temperature of the extruder was about 50° C.±5° C. and the composition produced had an application rate of 48 grams per minute. The application rate value that was obtained for Examples 1 and 7 were for compositions having a Specific Gravity in the range of 1.010 to 1.050.

EXAMPLE 3

The same process was operated as in Example 1 utilizing the same ingredients and the same extruder. The process was operated continuously as in Examples 1 and 2. However, in place of the catalyst composition of Example 1, there was utilized the catalyst composition given below, which was added in barrel two or stage two of the extruder. The type of ingredients, as well as the amount of the ingredients, that were added to barrel one and barrel eleven were the same as Example 1. The catalyst composition that was added in barrel two continuously in this Example was 7.5 parts by weight of methyltrimethoxy silane, 0.5 parts by weight of acetic acid, and 1.0 parts by weight of n-dihexylamine. The processing temperature of the extruder was maintained about 50° C.±5° C. and the application rate of the uncured composition was about 57 grams per minute for a composition having a specific gravity in the range of 1.010 to 1.050.

EXAMPLE 4

This Example as well as Examples 1, 2 and 3, were operated in a devolatilizing extruder only. The type and amount of ingredients added in barrel one and barrel eleven of the extruder were the same as in Example 1. The catalyst ingredients added in barrel two were different from Example 1 and were 10 parts by weight of methyltrimethoxy silane, 0.66 parts by weight of acetic acid and 1.34 parts by weight of n-dihexylamine. The processing temperature of the extruder was 50° C.±5° C. and the application rate of the uncured composition that was produced was 76 grams per minute for an uncured RTV silicone rubber composition having a Specific Gravity in the range of 1.010 to 1.050.

EXAMPLE 5

In this Example, as in the first four Examples, the composition was prepared by mixing it in the devolatilizing extruder only. In the hopper of the extruder, there was added 17 parts by weight of octamethylcyclotetrasiloxane treated fumed silica. In barrel one of the extruder, there was added 100 parts by weight of silanol end-stopped dimethylpolysiloxane polymer having a viscosity in the range of 100,000 to 200,000 cps at 25° C. The same 10 parts of the same "MTD" fluid as in Example 1, and 40 parts by weight of the same trimethylsiloxy end-stopped dimethylpolysiloxane polymer of Example 1 and, 0.2 parts by weight of the polyether of Example 1 were also added in barrel one. In barrel two, there was added 6.7 parts by weight of dimethyltetramethoxysilazane, 0.33 parts of acetic acid, and 0.67 parts of n-dihexylamine. In barrel eleven, there was continuously added 1.7 parts of 3-(2-aminoethylamino)-propyltrimethoxysilane, and 0.6 parts of dibutyltindiacetate. The process was operated continuously. The processing temperature of the composition was maintained at about 80° C. The production rate of the composition was 149 lbs per hour. The uncured composition that was prepared by the above process had the following physical properties.

TABLE I

| Aging | 24 hrs/RT | 24 hrs/100° C. | 48 hrs/100° C. |
|---|---|---|---|
| TFT | 210 (min.) | 210 (min.) | 210 (min.) |
| Durometer Shore A | 14 | 15 | 15 |
| Tensile, psi | 132 | 130 | 112 |
| Elongation, % | 232 | 312 | 289 |
| Modulus (75%) | 50 | 45 | 42 |
| Flow (Boeing Jig Test) | 0.1" | 0.3" | 0.0" |
| Application Rate | 88.8/min. | 85.8/min. | 79 g/min. |
| Specific Gravity | 1.019 | — | — |

EXAMPLE 6

This Example utilizes both the static mixer and the devolatilizing extruder in the processing of the composition. The composition was processed continuously. In accordance with the above, there was continuously mixed in the static mixer, 100 parts by weight of a silanol end-stopped dimethylpolysiloxane polymer having a viscosity in the range of 100,000 to 200,000 cps at 25° C., 1.05 parts by weight of methyltrimethoxysilane, 0.21 parts by weight of n-dihexylamine and 0.05 parts by weight of acetic acid. The temperature of the static mixer was controlled at 60° C.±5° C. The end-capping reaction was allowed to proceed for one hour at which time the presence of residual silanol groups were determined by infrared spectrometry. Then, 0.5 parts by weight of hexamethyldisilazane was added to scavenger the free methanol in the polymer.

This methyldimethoxy end-capped polymer was then stored approximately one week in a sealed container at room temperature prior to extruder mixing. The pre endcapped polyalkoxy terminated dimethylpolysiloxane polymer was at the end of that time pumped into barrel one of a Werner-Pfleider devolatilizing extruder. In the hopper there was added 17 parts by weight of the octamethylcyclotetrasiloxane treated fumed silica and then in barrel one, there was continuously added, as stated previously, 100 parts by weight of the pre endcapped dimethylpolysiloxane polymers, 10 parts by weight of the "MTD" fluid of Example 1, 20 parts by weight of the treated fumed silica and 0.2 parts by weight of a polyether which is sold under the tradename of UCON LB-1145 by Union Carbide Corporation. In barrel seven of the extruder, there was continuously added 3.7 parts by weight of hexamethyldisilazane and in barrel eleven of the extruder, there was continuously added 0.7 parts by weight of methyltrimethoxysilane, 1.47 parts by weight of aminoethyl, aminopropyl, trimethoxysilane, and 0.9 parts by weight of dibutyltindiacetate. The processing temperature of the extruder was maintained at 50° C.±5° C. and the production rate was 150 pounds per hour of uncured material. The data on the physicals of the uncured mixed composition are as listed in Table II below:

TABLE II

| Aging | 24 hr/RT | 48 hrs/100° C. |
|---|---|---|
| TFT | 20 min. | 20 min. |
| Shore A | 15 | 11 |
| Tensile | 169 | 140 |
| Elongation | 456 | 455 |
| Modulus, 50% | 41 | 34 |
| Modulus, 100% | 53 | 45 |
| Flow (hand/press) | 0.1/0.45" | 0.1/0.1" |
| Application Rate | 176 g/min. | 200 g/min. |
| Specific Gravity | 1.026 | — |

EXAMPLE 7

There was continuously prepared as in Example 6 an uncured RTV composition which was continuously mixed in a static mixer and in a devolatilizing extruder. The methyldimethoxy endcapped dimethylpolysiloxane polymer of 100,000 to 200,000 cps at 25° C. was prepared in a static mixer as described in Example 6. This polymer was pumped into the devolatilizing extruder continuously and mixed with other ingredients as follows. In the hopper of the devolatilizing extruder there was continuously fed 17 parts by weight of octamethylcyclotetrasiloxane treated fumed silica. In barrel one of the extruder, there was added 100 parts by weight of the endcapped dimethylpolysiloxane polymer, 10 parts by weight of the "MTD" fluid of Example 1, 40 parts by weight of the trimethylsiloxy end-stopped dimethylpolysiloxane polymer of Example 1, 0.2 parts by weight of the polyether sag control agent of Example 6. In barrel eleven, there was continuously added 3.68 parts by weight of hexamethyldisilizane, 0.74 parts by weight of methyl trimethoxysilane, and 1.47 parts by weight of 3-(2-aminoethylamino)-propyltrimethoxysilane, and 0.19 parts of dibutyltindiacetate. The processing temperature of the extruder was maintained at about 50° C.±5° C., and the production rate of the extruder was 150 pounds per hour. The physical data on the uncured composition that was continuously produced by the above process is listed in Table III below.

TABLE III

| Aging | 24 hr/RT | 48 hrs/100° C. |
|---|---|---|
| TFT | 20 min | 50 min |
| Shore A | 14 | 11 |
| Tensile | 178 | 138 |
| Elongation | 532 | 520 |
| Modulus, 50% | 34 | 26 |
| Modulus, 100% | 45 | 37 |
| Flow (hand/press) | 0.1"/0.2" | 0.1"/0.25" |
| Application Rate | 190 g/min. | 171 g/min. |
| Specific Gravity | 1.029 | — |

EXAMPLE 8

The following examples illustrate the preferred end-capping reactions which are utilized in the instant invention. However, a devolatilizing extruder and continuous mixing were not utilized in these two Examples. The Examples are only set forth below to disclose the preferred end-capping reaction that is utilized and which is necessary for a continuous process within the scope of the instant invention. To 100 parts by weight of polyalkoxy terminated dimethylpolysiloxane of about 3,000 cps viscosity at 25° C., there was mixed 4.5 parts of methyltrimethoxysilane, 0 to 0.2 parts of acetic acid, and 0 to 0.5 parts of n-dihexylamine. The mixing was carried out at 80° C. for 15 minutes. The degree of end-capping was measured by infrared. The results are set forth in Table IV below.

TABLE IV

| Exp. | Acetic Acid level (g) | HN (hexyl)₂ Level (g) | % Endcapped |
|---|---|---|---|
| #1 | 0. | 0.5 | 34 |
| #2 | 0.2 | 0. | 19 |
| #3 | 0.2 | 0.5 | 100 |
| #4 | 0.2 | 0.5 | 97 |

EXAMPLE 9

A suitable mixer equipped with a vacuum line and nitrogen purge was charged with 100 parts of a silanol end-stopped dimethylpolysiloxane polymer of about 120,000 cps viscosity at 25° C., 17 parts of octamethyltetrasilaxane treated fumed silica, 35 parts of a silanol containing trimethylsiloxy end-stopped dimethylpolysiloxane fluid, 15 parts of the silanol containing "MTD" fluid of Example 1, and 0.2 parts of a polyether sold under the tradename of UCON LB-1145 by Union Carbide Corporation. This mixture was agitated under full vacuum of about 20 mm of Hg. at room temperature for 2 hours to give an RTV base. To 100 parts of this base preheated to 80° C., was added 4.0 parts of methyltrimethoxysilane, 0.2 parts of an acetic acid, and 0.4 parts of n-dihexylamine followed by a 15 minute mixing using the Semkit ® mixer. A solution comprised of 0.10 parts of 3-(2-aminoethylamino)-propyltrimethoxysilane, 2.0 parts by weight of hexamethyldisilazane, and 0.2 parts of dibutyltindiacetate was added to the previous mixture followed by a second 15 minute mix. Following mixing, the RTV composition was placed in sealed aluminum tubes and stored for 24 hours at room temperature and 24 hours at 100° C. After aging, the material was pressed into ASTM sheets and allowed to cure three days at room temperature at 50% relative humidity. After curing, the physical property profile was measured and the following results are set forth in Table V.

TABLE V

| Property | Result, 24 hr/RT | Result, 24 hr/100° C. |
|---|---|---|
| Flow, inch | 0.1 | 0.1 |
| Application rate, g/min. | 216 | 195 |
| Specific Gravity | 1.035 | 1.035 |
| Tack Free Time (min.) | 30 | 30 |
| Hardness, Shore A | 15 | 12 |
| Tensile Strength, psi | 153 | 157 |
| Elongation, % | 408 | 517 |
| Modulus, 75% | 42 | 35 |
| Peel Adhesion, ppi/% Coh. | | |
| Alum. (anodized) | 42/90 | no data |
| Glass | 51/95 | " |
| Galvanized Steel | 44/80 | " |
| PVC | 58/100 | " |
| Lexan | 35/85 | " |

EXAMPLE 10

A suitable mixer equipped with a vacuum line and nitrogen purge was charged with 100 parts of a silanol end-stopped dimethylpolysiloxane polymer having a viscosity of 120,000 cps at 25° C., 17 parts of the treated fumed silica of Example 9, 20 parts of the silanol containing trimethylsiloxy end-stopped dimethylpolysiloxane polymer of Example 1, 10 parts of a silanol containing "MTD" fluid of Example 1 and 0.2 parts of a polyether of Example 10. This mixture was agitated under full vacuum (20 mm of Hg.) at room temperature for 2 hours to give an RTV base. Utilizing the Semkit ® mixer in two steps as follows, there was mixed a composition. First, in a 15 minute mix, there was added to 100 parts of the base as produced as above, 2.5 to 4.5 parts of methyltrimethoxy silane as listed in Table VI below, 0.13 parts of acetic acid, and 0.33 parts of n-dihexylamine.

This mixture was mixed for 15 minutes at 80° C., then in a second mixing step for 15 minutes, there was mixed 2.7 parts of hexamethyldisilazane, 1.0 parts of the adhesion promoter of Example 9 and 0.33 parts of dibutyltindiacetate. Following mixing, the RTV composition was placed in sealed aluminum tubes and stored for 24 hours at room temperature and 48 hours at 100° C. After aging, the material was pressed into ASTM sheets and allowed to cure for 3 days at room temperature and 50% relative humidity. The physical properties were then measured with the following results as listed in Table VI below.

TABLE VI

| | Methyltrimethoxysilane level (g) | | | | |
|---|---|---|---|---|---|
| Property | 2.5 | 3.0 | 3.5 | 4.0 | 4.5 |
| 24 hr/RT Tack Free Time (min) | 20 | 20 | 20 | 20 | 20 |
| 24 hr/100° C. Tack Free Time (min) | 25 | 25 | 25 | 25 | 30 |
| 24 hr/R.T. Application Rate, g/min. | 109 | 100 | — | 113 | 120 |
| 24 hr/R.T. Durometer, Shore A | 15 | 20 | 21 | 24 | 22 |
| 24 hr/R.T. Tensile, | 217 | 286 | 318 | 238 | 247 |

TABLE VI-continued

| Property | Methyltrimethoxysilane level (g) | | | | |
|---|---|---|---|---|---|
| | 2.5 | 3.0 | 3.5 | 4.0 | 4.5 |
| psi 24 hr/R.T. Elongation, % | 481 | 511 | 487 | 504 | 456 |

EXAMPLE 11

Utilizing the base composition described in Example 8, there were prepared various compositions which were mixed in two steps in the Semkit ® mixer, the mixing was carried out as follows. In a 15 minute mixing period, in the mixer there was mixed 100 parts of the base of Example 1, 3.0 to 4.5 parts as indicated in Table VII below of methyltrimethoxysilane, 0.1 to 0.25 parts as indicated in Table VII below of acetic acid, and 0.5 parts of n-dihexylamine. In a second mixing step, as indicated in Table VII below, there was mixed 2 to 3.0 parts of dimethyltetramethoxydisilazane, and 0.4 parts by weight of dibutyltindiacetate. To this there was added 1.0 parts of the adhesion promoter of Example 9. The Tack Free Times were measured after 24 hours at room temperature and 24 hours at 100° C. and 48 hours at 100° C., aging with the results indicated in Table VII below.

TABLE VII

| CH₃Si(OCH₃)₃ (g) | HOAc (g) | [CH₃Si(OCH₃)₂]₂NH (g) | TFT (min.) | | | |
|---|---|---|---|---|---|---|
| | | | Init. | R.T. 24 hrs. | 100° C. 24 hrs. | 100° C. 48 hrs. |
| 4.5 | 0.25 | 3.0 | 20 | 20 | 10 | 15 |
| 4.0 | 0.2 | 2.0 | 20 | 20 | not cured | — |
| 3.0 | 0.16 | 3.0 | 20 | 20 | 20 | 25 |

What we claim as new and desire to secure by Letters Patent of the United States is:

1. A continuous process for preparing a stable, one package, substantially anhydrous, room temperature vulcanizable organopolysiloxane composition, stable under ambient conditions in the substantial absence of moisture over an extended period of time and convertible to a tack-free elastomer, comprising passing through a devolatilizing extruder:
   (a) an organopolysiloxane wherein the silicon atom at each polymer chain end is hydroxy terminated;
   (b) a polyalkoxy crosslinking agent; and
   (c) an end-capping catalyst system which is a mixture of an acidifying agent and an amine where the acidifying agent is a Lewis acid and wherein the amine is selected from primary, secondary and tertiary amines;
so as to produce polyalkoxy-terminated organopolysiloxanes wherein when a condensation catalyst is mixed in the polyalkoxy-terminated organopolysiloxane there is formed an RTV composition.

2. The process of claim 1 wherein (a), (b) and (c) are mixed in a static mixer to produce polyalkoxy-terminated organopolysiloxanes, further comprising mixing additional ingredients into the polyalkoxy-terminated organopolysiloxane in a devolatilizing extruder.

3. The process of claim 2 wherein in the initial mixing chamber of the devolatilizing extruder, there is mixed the polyalkoxy-terminated organopolysiloxane, fumed silica, a triorganosiloxy end-stopped diorganopolysiloxane plasticizer polymer of 10 to 20,000 centipoise viscosity at 25° C. and a polyether as a sag control agent.

4. The process of claim 3 wherein there is present from 1 to 50 parts by weight of the fumed silica, from 10 to 50 parts by weight of the triorganosiloxy end-stopped diorganopolysiloxane plasticizer polymer where the organo is a monovalent hydrocarbon radical and 0.1 to 2.0 parts by weight of the polyether per 100 parts by weight of the polyalkoxy-terminated organopolysiloxane.

5. The process of claim 3 wherein in a subsequent mixing chamber in the devolatilizing extruder there is further added amounts of a scavenger effective for tying up hydroxyl groups.

6. The process of claim 5 wherein in a subsequent mixing chamber after additional amounts of the scavenger have been added, there is added a mixture of a condensation catalyst, adhesion promoter, and optionally, excess amounts of the polyalkoxy silane cross-linking agent.

7. The process of claim 2 wherein the static mixer is operated at a temperature of 40° C. to 100° C.

8. The process of claim 7 wherein the devolatilizing extruder is operated at a temperature in the range of 40° to 100° C. and at a vacuum that is less than 20 inches Hg.

9. The process of claim 2 wherein the devolatilizing extruder is a single screw devolatilizing extruder.

10. The process of claim 2 wherein the devolatilizing extruder is a twin-screw devolatilizing extruder.

11. The process of claim 2 which produces a room temperature vulcanizable silicone rubber composition that has an application rate in the uncured state above 50 to 100 grams per minute or higher.

12. The process of claim 2 wherein in the initial mixing chamber of the devolatilizing extruder, there is mixed the polyalkoxy-terminated organopolysiloxane, fumed silica, calcium carbonate, a sag control polyether, atriorganosiloxy end-stopped diorganopolysiloxane where the organo is a monovalent hydrocarbon radical, having a viscosity of 10 to 20,000 centipoise at 25° C. and a MTD plasticizer having from (i) 5 to 60 mole percent of monoalkylsiloxy, siloxy units or a mixture of such units; (ii) from 1 to 6 mole percent of trialkylsiloxy units; (iii) from 34 to 94 mole percent of dialkylsiloxy units; said plasticizer having from about 0.1 to 2.0 by weight of silicon-bonded hydroxyl groups.

13. The process of claim 12 wherein the fumed silica is treated with cyclic polysiloxanes and the calcium carbonate is treated with stearic acid.

14. The process of claim 13 wherein there is present from 1 to 50 parts by weight of fumed silica, from 100 to 300 parts by weight of calcium carbonate, from 0.1 to 2.0 parts by weight of the polyether, from 10 to 50 parts by weight of the triorganosiloxy end-stopped diorganopolysiloxane and from 2 to 20 parts by weight of the MTD plasticizer per 100 parts by weight of the polyalkoxy-terminated organopolysiloxane.

15. The process of claim 12 wherein in a subsequent mixing chamber in the devolatilizing extruder there is added a scavenger.

16. The process of claim 15 wherein in a subsequent mixing chamber, after the scavenger has been added, there is added a mixture of condensation catalyst, adhesion promoter and optionally, excess amounts of polyalkoxy silane cross-linking agent.

17. The process of claim 12 wherein the static mixer is operated at a temperature of 40° to 100° C.

18. The process of claim 17 wherein the devolatilizing extruder is operated at a temperature in the range of 40° to 100° C. and at a vacuum less than 20 inches of Hg.

19. The process of claim 12 wherein the devolatilizing extruder is a twin-screw devolatilizing extruder.

20. The process of claim 12 which produces a room temperature vulcanizable silicone rubber composition that can be applied to a substrate in the uncured state at the rate of 50 to 100 grams per minute.

21. The process of claim 2 wherein in the devolatilizing extruder there is added a stabilizing amount of a scavenger for hydroxy functional groups selected from the group consisting of non-cyclic silyl nitrogen compounds of the formula

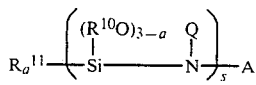

and cyclic silyl nitrogen compounds having at least one or all of the units of the formula

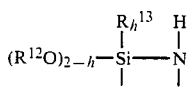

and the rest of the units, if any, having the formula

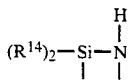

where $R^{10}$ is a $C_{1-8}$ aliphatic organic radical selected from the group consisting of alkyl, alkylether, alkylester, alkylketone, alkylcyano and aryl, $R^{11}$ is a $C_{1-8}$ monovalent substituted or unsubstituted hydrocarbon radical, Q is selected from hydrogen, $C_{1-8}$ monovalent substituted or unsubstituted hydrocarbon radicals and radicals of the formula

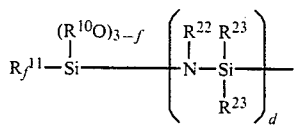

where $R^{10}$ and $R^{11}$ are as previously defined, where a varies from 0 to 2, f varies from 0 to 3, h is 0 or 1, where s is a whole number that varies from 1 to 25, d is a whole number that varies from 1 to 25, $R^{22}$ is selected from hydrogen and $C_{1-8}$ monovalent hydrocarbon radicals and $R^{23}$ is independently selected from $C_{1-8}$ monovalent hydrocarbon and hydrocarbonoxy radicals, A is selected from the group consisting of hydrogen and $C_{1-8}$ monovalent substituted or unsubstituted hydrocarbon radicals and radicals of the formula

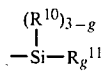

where $R^{10}$ and $R^{11}$ are as previously defined, g varies from 0 to 3 and in the above scavengers there is at least one hydrocarbonoxy group in the molecule, $R^{12}$ is defined the same as $R^{10}$, $R^{13}$ is defined the same as $R^{11}$ and $R^{14}$ is defined the same as $R^{11}$.

22. The process of claim 2, having an effective amount of a cross-linking silane of the formula

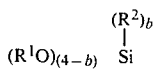

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, and b is a whole number equal to 0 or 1.

23. The process of claim 21 wherein the scavenger and cross-linking agent has the formula

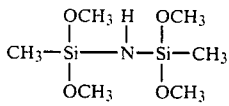

24. The process of claim 21 wherein the cross-linking agent and scavenger is a cyclic silazane where $R^{12}$, $R^{13}$ are methyl.

25. The process of claim 1 wherein the acid is a Løwry-Bronsted acid selected from acid anhydrides.

26. The process of claim 1 wherein the acid is Løwry-Bronsted acid of the formula

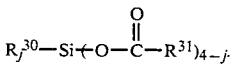

where $R^{30}$, $R^{31}$ are $C_{(1-20)}$ monovalent hydrocarbon radicals, j is a whole number that varies from 0 to 3.

27. The process of claim 1 wherein the acid is a Løwry-Bronsted acid of the formula

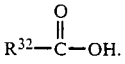

where $R^{32}$ is a $C_{(1-20)}$ monovalent hydrocarbon radical.

28. The process of claim 1 wherein the acid is a Løwry-Bronsted inorganic acid.

29. The process of claim 28 wherein inorganic acid is selected from the class consisting of HCl, $H_3PO_4$, $H_2SO_4$ and polyphosphoric.

30. The process of claim 1 wherein the acid anhydrides have the formula

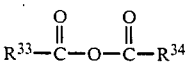

where $R^{33}$, $R^{34}$ are $C_{(1-20)}$ monovalent hydrocarbon radicals.

31. The process of claim 1 wherein the acid is a Lewis acid selected from the class consisting of $$BF_3, (CH_3CH_2)_2O, \text{ and } AlCl_3.$$

32. The process of claim 2 wherein there is added in the devolatilizing extruder a stabilizing amount of scavenger for hydroxy functional groups which is a silicon-nitrogen compound selected from the group consisting of:

(A) a silicone-nitrogen compound having the formula $$(Y)(R''')_2SiNSi(R''')_2(Y)$$
$$\overset{R''}{|}$$

where Y is selected from $R''$ and $R'''_2N-$ and (B) a silicon-nitrogen polymer comprising
  (i) from 3 to 100 mole percent chemically combined structural units having the formula $$-\underset{|}{\overset{R''}{\overset{|}{Si}}}N- \text{ and}$$

(2) from 0 to 97 mole percent chemically combined structural units represented by the formula $$(R''')_c SiO_{\frac{4-c}{2}}$$

where the silicon atoms of said silicon-nitrogen polymer are joined to each other by a member selected from an SiOSi linkage and an SiNR''Si linkage, the free valences of said silicon atoms other than those joined to oxygen to form a siloxy unit and nitrogen to form a silazy unit are joined to a member selected from an $(R'')_2N$ radical and an $R'''$ radical and where the ratio of the sum of said $R'''$ radicals and said $(R'')_2N$ radicals to the silicon atoms of said silicon-nitrogen polymer has a value of 1.5 to 3 inclusive, $R''$ is a member selected from the group consisting of hydrogen, monovalent hydrocarbon radicals, and fluoroalkyl radicals, $R'''$ is a member selected from hydrogen, monovalent hydrocarbon radicals and fluoroalkyl radicals, and c is a whole number equal to 0 to 3 inclusive.

33. The process of claim 32 wherein the silazane polymers are cyclic silazanes of chemically combined $$-\underset{\underset{R'''}{|}}{\overset{R'''}{\overset{|}{Si}}}\overset{R''}{\overset{\diagup}{N}}-$$

units where $R''$, $R'''$ are as previously defined to provide for a ratio of 1.5 to 3.0 of the sum of the $R'''$ and $(R'')_2N$ radicals per silicon atom in said silazane polymer.

34. The process of claim 32 wherein the silazane polymer comprises linear polymers having at least one unit selected from the class consisting of $$R''_2N-\underset{\underset{R'''}{|}}{\overset{R'''}{\overset{|}{Si}}}-\overset{R''}{\overset{\diagup}{N}}-.$$

units, and $$(R''')_3Si-\underset{}{\overset{R''}{\overset{|}{N}}}-.$$

units where $R''$, $R'''$ are as previously defined to provide for a ratio of 1.5 to 3 of the sum of the $R'''$ and $(R'')_2N$ radicals per silicon atom in said silazane polymer.

35. The process of claim 32 wherein the silazane polymers comprise linear polymers consisting essentially of $$-\underset{\underset{R'''}{|}}{\overset{R'''}{\overset{|}{Si}}N}-\overset{R''}{\overset{\diagup}{}}$$

units where $R''$ and $R'''$ are as defined to provide for a ratio of 1.5 to 3.0 of the sum of the $R'''$ and $(R'')_2N$ radicals per silicon atom in said silazane polymer.

36. The composition of claim 32 wherein the silazane polymers comprise having at least one unit selected from the class consisting of $$(R'')-\underset{|}{\overset{R'''}{\overset{|}{Si}}N}-\overset{R''}{\overset{\diagup}{}}$$

units and $$(R''')_3SiN-\overset{R''}{\overset{|}{}}$$

units where $R''$ and $R'''$ are as previously defined to provide for a ratio of 1.5 to 3 of the sum of the $R'''$ and $(R'')_2N$ radicals per silicon atom in said silazane polymer.

37. The composition of claim 32 wherein the silazane-siloxane compounds are copolymers with up to 97 mole percent of $$(R''')_c SiO_{\frac{4-c}{2}}$$

units wherein the silazane units are selected from the group consisting of, $$\left((R''')_c Si\overset{R''}{\overset{|}{N}}\right)_{\frac{4-c}{2}}, (R'')_2N\underset{\underset{R'''}{|}}{\overset{R'''}{\overset{|}{Si}}}O- \text{ and } (R'')_2N\underset{\underset{R''}{|}}{\overset{R''}{\overset{|}{Si}}}-\overset{R''}{\overset{|}{N}}-$$

where $R''$ and $R'''$ and c are as previously defined to provide for a ratio of the sum of $R'''$ and $(R'')_2N$ radicals per silicon atom of said silazane-siloxane copolymer of from 1.5 to 3.

38. The composition of claim 32 wherein the silazane-siloxane compounds are cyclic consisting of chemically combined (R''')₂SiO units and

units where R'' and R''' are as previously defined.

39. The composition of claim 32 wherein the silazane compound is a polysiloxane having the formula

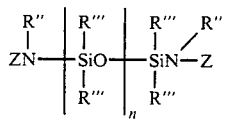

where R'', R''' and n are as defined previously and Z is a member selected from R'' and Si(R''')₃.

40. The process of claim 2 further comprising adding in the devolatilizing extruder a stabilizing amount of silane scavenger for hydroxy functional groups which is a silyl amine of the formula

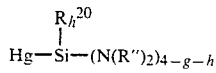

where R'' is a radical selected from the group consisting of hydrogen and $C_{(1-8)}$ monovalent hydrocarbon radicals, $R^{20}$ is selected from $C_{(1-8)}$ monovalent hydrocarbon radicals, $C_{(1-8)}$ alkoxy radicals and fluoroalkyl radicals, and g is a whole number that varies from 1 to 3, h is a whole number that varies from 0 to 2 and the sum of h+g does not exceed 3.

41. A method of continuously preparing a stable, one package, substantially anhydrous and substantially acid-free room temperature vulcanizable organopolysiloxane composition stable under ambient conditions in the substantial absence of moisture over an extended period of time and convertible to a tack-free elastomer, comprising continuously mixing in a devolatilizing extruder
   (a) an organopolysiloxane wherein the silicon atom at each polymer chain end is hydroxy terminated;
   (b) a polyalkoxy crosslinking agent;
   (c) an endcapping catalyst system comprising a Lewis acid and an amine selected from primary, secondary and tertiary amines;
   (d) an effective amount of a condensation catalyst and,
   (e) an amount of a scavenger effective for tying up hydroxyl groups.

42. The method of claim 41 wherein the scavenger for hydroxy functional groups is selected from the class consisting of a non-cyclic silyl nitrogen scavenger of the formula

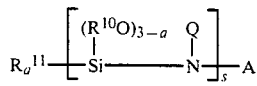

and cyclic silyl nitrogen scavengers having at least one or all of the units of the formula,

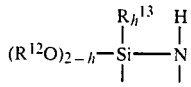

and the rest of the units, if any, having the formula

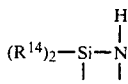

where $R^{10}$ is a $C_{1-8}$ aliphatic organic radical selected from the group consisting of alkyl, alkylether, alkylester, alkylketone, alkylcyano, and aryl, $R^{11}$ is a $C_{1-8}$ monovalent substituted or unsubstituted hydrocarbon radical, Q is selected from hydrogen, $C_{1-8}$ monovalent substituted or unsubstituted hydrocarbon radicals and radicals of the formula

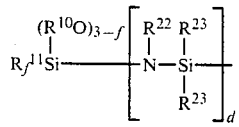

where $R^{10}$, $R^{11}$ are as previously defined, where a varies from 0 to 2, f varies from 0 to 3, h is 0 or 1, where s is a whole number that varies from 1 to 25, d is a whole number that varies from 1 to 25, $R^{22}$ is selected from hydrogen and $C_{1-8}$ monovalent hydrocarbon radicals and $R^{23}$ is independently selected from monovalent hydrocarbons and hydrocarbonoxy radicals, A is selected from the class consisting of hydrogen and $C_{1-8}$ monovalent substituted or unsubstituted hydrocarbon radicals and radicals of the formula

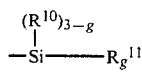

where $R^{10}$, $R^{11}$ are as previously defined, g varies from 0 to 3 and in the above scavengers there is at least one hydrocarbonoxy group in the molecule, $R^{12}$ is defined the same as $R^{10}$, and $R^{13}$ is defined the same as $R^{11}$, and $R^{14}$ is defined the same as $R^{11}$.

43. The method of claim 41 having an effective amount of a cross-linking silane of the formula

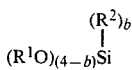

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radicals, and b is a whole number equal to 0 or 1.

44. The method of claim 41 wherein the acid is a Lǿwry-Bronsted acid selected from acid anhydrides.

45. The method of claim 41 wherein the acid is a Lǿwry-Bronsted acid of the formula

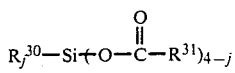

where $R^{30}$, $R^{31}$ are $C_{(1-20)}$ monovalent hydrocarbon radicals, j is a whole number that varies from 0 to 3.

46. The method of claim 41 wherein the acid is a Lφwry-Bronsted acid of the formula

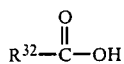

where $R^{32}$ is a $C_{(1-20)}$ monovalent hydrocarbon radical.

47. The method of claim 41 wherein the acid is a Lφwry-Bronsted inorganic acid.

48. The method of claim 41 wherein inorganic acid is selected from the class consisting of HCl, $H_3PO_4$, $H_2SO_4$, and polyphosphoric.

49. The method of claim 44 wherein the acid anhydrides have the formula

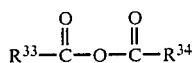

where $R^{33}$, $R^{34}$ are $C_{(1-20)}$ monovalent hydrocarbon radicals.

50. The method of claim 41 wherein the acid is a Lewis acid selected from the class consisting of $BF_3(CH_3CH_2)_2O$, and $AlCl_3$.

51. The method of claim 41 wherein the stabilizing amount of scavenger for hydroxy functional groups is a silicon-nitrogen compound selected from the group consisting of:
(a) a silicon-nitrogen compound having the formula

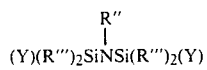

where Y is selected from R" and R'''$_2$N— and
(b) a silicon-nitrogen polymer comprising
(i) from 3 to 100 mole percent chemically combined structural units selected from the group consisting of units having the formula

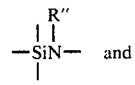

(2) from 0 to 97 mole percent chemically combined structural units represented by the formula

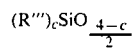

where the silicon atoms of said silicon-nitrogen polymer are joined to each other by a member selected from an SiOSi linkage and a SiNR"Si linkage, the free valences of said silicon atoms other than those joined to oxygen to form a siloxy unit and nitrogen to form a silazy unit are joined to a member selected from an (R")$_2$N radical and an R''' radical, and where the ratio of the sum of said R''' radicals and said (R")$_2$N radicals to the silicon atoms of said silicon-nitrogen polymer has a value of 1.5 to 3, inclusive, R" is a member selected from the group consisting of hydrogen, monovalent hydrocarbon radicals and fluoroalkyl radicals, R''' is a member selected from the group consisting of hydrogen, monovalent hydrocarbon radicals and fluoroalkyl radicals, and c is a whole number equal to 0 to 3, inclusive.

52. The process of claim 42 wherein the stabilizing amount of scavenger for hydroxy functional groups is a silyl amine of the formula

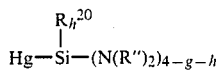

where R" is a radical selected from the group consisting of hydrogen and $C_{(1-8)}$ monovalent hydrocarbon radicals, $R^{20}$ is selected from $C_{(1-8)}$ monovalent hydrocarbon radicals, $C_{(1-8)}$ alkoxy radicals and fluoroalkyl radicals, and g is a whole number that varies from 1 to 3, h is a whole number that varies from 0 to 2 and the sum of h+g does not exceed 3.

53. The composition of claim 32 wherein the silazane compound has the formula

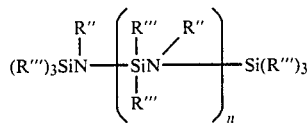

where R" and R''' are selected from the group consisting of hydrogen, monovalent hydrocarbon radicals and fluoroalkyl radicals an n is a whole number from 0 to 20.

54. The composition of claim 32 wherein the silazane compound is a cyclic silazane having the formula

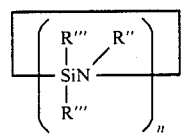

where R" and R''' are selected from the group consisting of hydrogen, monovalent hydrocarbon radicals and fluoroalkyl radicals and n is a whole number from 0 to 20.

55. A continuous process for preparing a stable, one package, substantially anhydrous room temperature vulcanizable organopolysiloxane composition stable under ambient conditions in the substantial absence of moisture over an extended period of time and convertible to a tack-free elastomer, comprising:
(1) passing through a static mixer
(a) an organopolysiloxane wherein the silicon atom at each polymer chain end is hydroxy terminated;
(b) a polyalkoxy crosslinking agent or an integrated cross-linker scavenger; and
(c) an effective amount of an endcapping catalyst system comprising a Lewis acid and an amine selected from primary, secondary and tertiary amines;

to produce a polyalkoxy terminated diorganopolysiloxane and (2) transmitting the polyalkoxy terminated diorganopolysiloxane through a devolatilizing extruder and mixing therein a condensation catalyst.

56. The process of claim 1 wherein the polyalkoxy crosslinking agent is also a scavenger for hydroxyl groups.

57. The process of claim 41 wherein the polyalkoxy crosslinking agent is also a scavenger for hydroxyl groups.

* * * * *